(12) United States Patent
Sugita et al.

(10) Patent No.: US 7,548,678 B2
(45) Date of Patent: Jun. 16, 2009

(54) OPTICAL ELEMENT AND METHOD FOR PRODUCING THE SAME

(75) Inventors: Tomoya Sugita, Moriguchi (JP); Kiminori Mizuuchi, Neyagawa (JP); Kazuhisa Yamamoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/906,574

(22) Filed: Oct. 3, 2007

(65) Prior Publication Data

US 2008/0037944 A1 Feb. 14, 2008

Related U.S. Application Data

(62) Division of application No. 10/448,608, filed on May 29, 2003, now Pat. No. 7,295,742.

(30) Foreign Application Priority Data

May 31, 2002 (JP) ............... 2002-159084
Aug. 27, 2002 (JP) ............... 2002-246527

(51) Int. Cl.
*G02B 6/10* (2006.01)
(52) U.S. Cl. .............. 385/129; 385/131; 385/132
(58) Field of Classification Search ......... 385/129–132
See application file for complete search history.

(56) References Cited

U.S. PATENT DOCUMENTS

| | | | |
|---|---|---|---|
| 4,240,849 A | 12/1980 | Kurokawa et al. | |
| 4,475,790 A | 10/1984 | Little | |
| 5,218,663 A | 6/1993 | Isono et al. | |
| 5,303,319 A * | 4/1994 | Ford et al. | 385/131 |
| 5,373,579 A | 12/1994 | Eda | |
| 5,408,566 A | 4/1995 | Eda et al. | |
| 5,459,807 A * | 10/1995 | Doumuki et al. | 385/129 |
| 5,619,369 A * | 4/1997 | Yamamoto et al. | 359/332 |
| 5,631,766 A * | 5/1997 | Venhuizen et al. | 359/328 |
| 5,737,138 A | 4/1998 | Someno | |
| 5,805,744 A * | 9/1998 | Nakano et al. | 369/110.02 |
| 5,991,490 A * | 11/1999 | Mizuuchi et al. | 385/130 |
| 6,222,967 B1 | 4/2001 | Amano et al. | |
| 6,227,722 B1 | 5/2001 | Kropp | |
| 6,385,376 B1 | 5/2002 | Bowers et al. | |
| 6,554,493 B2 | 4/2003 | Melchior et al. | |
| 6,684,008 B2 | 1/2004 | Young et al. | |
| 6,687,427 B2 * | 2/2004 | Ramalingam et al. | 385/16 |
| 6,807,323 B2 * | 10/2004 | Beom et al. | 385/12 |
| 6,961,490 B2 * | 11/2005 | Maisenhoelder et al. | 385/37 |
| 6,964,527 B2 | 11/2005 | Sasaki et al. | |
| 6,994,479 B2 | 2/2006 | Sasaki et al. | |

(Continued)

FOREIGN PATENT DOCUMENTS

JP 6-222229 8/1994

(Continued)

*Primary Examiner*—Ellen Kim
(74) *Attorney, Agent, or Firm*—Hamre, Schumann, Mueller & Larson, P.C.

(57) ABSTRACT

An optical element is provided that includes a base substrate, a waveguide substrate, and a thin film layer that is provided between the base substrate and the waveguide substrate and that has a single-layer structure of a multilayer structure including a film containing $Ta_2O_5$ or $Nb_2O_5$ as a principal component.

14 Claims, 12 Drawing Sheets

U.S. PATENT DOCUMENTS

| | | |
|---|---|---|
| 2001/0041034 A1 | 11/2001 | Sasaki et al. |
| 2001/0055453 A1 | 12/2001 | Mizuuchi et al. |
| 2002/0017663 A1 | 2/2002 | Takahashi et al. |
| 2002/0041748 A1 | 4/2002 | Wu |
| 2004/0207896 A1 | 10/2004 | Aoki et al. |
| 2006/0292744 A1 | 12/2006 | Enquist et al. |

FOREIGN PATENT DOCUMENTS

| | | |
|---|---|---|
| JP | 6-289347 | 10/1994 |
| JP | 2574594 | 10/1996 |
| JP | 2574602 | 10/1996 |
| JP | 2574606 | 10/1996 |
| JP | 2606525 | 2/1997 |
| JP | 2002-250949 | 9/2002 |
| JP | 2003-177263 | 6/2003 |

* cited by examiner

Plan View

Front View    Right-side View

OPTICAL ELEMENT AND METHOD FOR PRODUCING THE SAME

CROSS-REFERENCE TO RELATED APPLICATIONS

This application is a Division of application Ser. No. 10/448,608, filed May 29, 2003, which application is incorporated herein by reference.

BACKGROUND OF THE INVENTION

1. Field of the Invention

The present invention relates to an optical element formed with a bonded pair of substrates, and a method for producing the optical element.

2. Related Background Art

In an optical element formed by bonding two substrates, a ridge optical waveguide can be formed by forming a ridge structure after thinning one of the substrates. For bonding these substrates, the direct bonding technique is known as a technique for firmly bonding these substrates without using an adhesive or the like. The direct bonding allows various materials such as glass, semiconductors, ferroelectrics, piezoelectric ceramics, etc. to be bonded with high precision, and therefore, the application of the same to optical elements has been highly expected. As an example of an optical element with use of a pair of directly bonded substrates (such a pair hereinafter sometimes is referred to as a direct-bond substrate) such as dielectric substrates, semiconductor substrates, and glass substrates, an optical waveguide-type element has been proposed. For instance, JP2574594 and JP06-222229A disclose a method for forming an optical waveguide by directly bonding lithium niobate or lithium tantalate as a ferroelectric crystal substrate with a substrate of the same type or a glass substrate.

Further, several proposals have been made regarding an optical element formed by bonding two substrates with a thin film interposed therebetween. In an optical element in which two substrates are used and one of them functions as a waveguide layer, the substrate functioning as the waveguide layer is required to have a higher refractive index. Therefore, a thin film having a lower refractive index than that of the waveguide layer is provided between the substrates, whereby light is guided irrespective of the refractive indices of the substrates. For instance, JP2574594 and JP06-222229A mentioned above disclose the use of $SiO_2$ or SiN as a material for the thin film. Further, JP2574606 discloses the use of low-melting glass as the thin film material. JP06-289347A discloses the use of a metal oxide or the like as the thin film material.

As described above, the optical element formed with substrates of the same type having equal refractive indices without a thin film layer interposed therebetween cannot be used as an optical waveguide. Further, in the case where two substrates having different refractive indices are bonded directly, as in the case where a lithium niobate substrate and a Mg-doped lithium niobate substrate are bonded directly, it is impossible to form an optical waveguide in a substrate having the lower refractive index.

By providing a thin film between two substrates, the foregoing problems can be solved. However, it is difficult to provide a thin film between two substrates. As described in JP2574594 and JP06-222229A, it is difficult to control a surface roughness of a thin film layer in the case where $SiO_2$, for instance, is used for forming a thin film, and a thin film formed by sputtering or vapor deposition has a significant roughness on its surface. A film with such a surface roughness is not suitable for direct bonding. The surface roughness can be reduced by, for instance, forming a thin film using a CVD (chemical vapor deposition) device, but the CVD device is expensive and bulky. Furthermore, the contact between a thin film and a substrate and the bond strength have a non-homogeneous distribution depending on conditions for the thin film formation, and when a bonded substrate pair is subjected to machining, a sufficient strength against the machining cannot be achieved.

Additionally, as shown in JP2574606, in the case where a low-melting glass is used for forming a thin film layer, for instance, a low-melting glass material is applied in a paste form over a substrate, bonded with another substrate, and subsequently baked. Therefore, it is difficult to control the film thickness so as to achieve a uniform thickness. Further, a technique described in JP06-289347A lacks practical utility, since metal oxide materials to be used for forming a thin film are not disclosed specifically in the publication.

Furthermore, for controlling a height of an optical waveguide and uniformity of the height thereof in forming an optical waveguide in a direct-bond substrate, it is important to determine a thickness of a substrate in which the optical waveguide is formed, among the substrates directly bonded, and to determine uniformity of the foregoing thickness. However, generally, it is difficult to determine optically the thickness uniformity of the optical waveguide with respect to a substrate where the waveguide is formed, and the control relies on the determination of a thickness of the entirety of the direct-bond substrate. Therefore, there is a drawback of insufficient thickness uniformity of the optical waveguide.

SUMMARY OF THE INVENTION

Therefore, it is an object of the present invention to provide an optical element having a structure obtained by bonding substrates, that is readily producible and provides a high selectivity of substrates used therein. It also is an object of the present invention to provide a method for producing the foregoing optical element.

An optical element of the present invention includes a base substrate, a waveguide substrate, and a thin film layer provided between the base substrate and the waveguide substrate, having a single-layer structure or a multilayer structure including a film containing $Ta_2O_5$ or $Nb_2O_5$ as a principal component. Therefore, a thin film having high thickness control precision and small surface roughness can be formed. Further, optical waveguide characteristics can be enhanced, irrespective of refractive indices of the waveguide substrate and the base substrate.

Further, it is preferable that at least one of bonding between the base substrate and the thin film layer and bonding between the waveguide substrate and the thin film layer is direct bonding. This enables bonding with high precision.

Still further, it is preferable that the waveguide substrate is made of $LiNb_xTa_{(1-x)}O_3$ ($0 \leq x \leq 1$). Therefore, the waveguide substrate has a high transmittance in a band of guided light. Moreover, since it has a non-linear optical effect, it can be used in a wavelength converter or the like.

Still further, it is preferable that an optical waveguide is formed in the waveguide substrate. This provides an optical element of an optical waveguide type.

Still further, it is preferable that the thin film layer has a thickness of not less than 50 nm. This makes it possible to achieve enhanced waveguide characteristics without waveguide losses.

Still further, it is preferable that the thin film layer includes a film containing $Ta_2O_5$ or $Nb_2O_5$ as a principal component on a surface to be subjected to the direct bonding. This reduces a surface roughness of the bonding surface and enables the direct bonding.

Still further, it is preferable that the thin film layer is a film formed on either the base substrate or the waveguide substrate in an atmosphere at a temperature of not lower than 100° C. This reinforces the adhesion between the waveguide substrate and the thin film layer.

Still further, it is preferable that the thin film layer is a multilayer film including a metal layer, the metal layer being not arranged on a surface of the thin film layer on a side of the waveguide substrate, and the waveguide substrate is bonded with the thin film layer. This allows the thickness uniformity measurement by the interference fringe observation to be carried out readily with respect to the waveguide substrate. It should be noted that the interference fringe observing method is a method for determining the thickness uniformity of a substrate by observing a state of interference between reflected lights.

Still further, it is preferable that the metal layer is formed on a surface of thin film layer on a side of the base substrate. This allows the thickness uniformity measurement by the interference fringe observation to be carried out readily with respect to the waveguide substrate. This particularly facilitates the measurement in the case where the thin film layer is composed of two layers.

Still further, it is preferable that a surface of the metal layer on a side of the waveguide substrate and a surface of the waveguide substrate on a side of the metal layer are separated by not less than 50 nm. This makes it possible to achieve enhanced waveguide characteristics without waveguide losses.

Still further, it is preferable that a distance between the metal layer and a light-incident end surface exceeds 1 μm. This makes it possible to achieve enhanced waveguide characteristics without waveguide losses.

Still further, it is preferable that the waveguide substrate is made of a crystal that is transparent with respect to light having a wavelength λ and that has a refractive index $n_1$ with respect to the light having the wavelength λ. The base substrate is made of a material having a refractive index $n_2$ with respect to the light having the wavelength λ. The thin film layer is made of a material having a refractive index $n_3$ with respect to the light having the wavelength λ, and has a thickness T satisfying, when $n_1>n_3$ and $n_2>n_3$, $T \neq (k \times \lambda)/(2 \times n_3)$, and when $n_1>n_3>n_2$, $T \neq ((2k-1) \times \lambda)/(4 \times n_3)$ where $n_3 \neq n_1 \neq n_2$, and k represents a natural number. This makes it possible to determine the thickness uniformity of the waveguide substrate by the interference fringe observation.

Still further, the wavelength λ may be set to any one of 380 nm, 410 nm, 441.6 nm, 488 nm, 532 nm, and 632.8 nm.

Still further, it is preferable that the waveguide substrate is made of a transparent crystal, and the thin film layer has a multilayer film structure made of a plurality of dielectric materials having different refractive indices. The thin film layer is configured so that when the light having the predetermined wavelength is incident perpendicularly on the waveguide substrate, lights reflected at the respective layers have phase differences such that the reflected lights do not cancel one another. This makes it possible to determine the thickness uniformity of the waveguide substrate by the interference fringe observation. The above-mentioned "transparent crystal" may have a light transmissivity with respect to light having a wavelength in a predetermined range.

Still further, the transparent crystal has a light transmissivity with respect to light with a wavelength in a range covering any one of 380 nm, 410 nm, 441.6 nm, 488 nm, 532 nm, and 632.8 nm.

Still further, another optical element of the present invention includes a waveguide substrate and a base substrate, in which the waveguide substrate and the base substrate are bonded with each other, and a bonding surface at which the waveguide substrate and the base substrate are bonded includes, in a part thereof, a non-bonding region at which they are not bonded. This makes it possible to enhance the optical waveguide characteristics without providing a thin film layer, irrespective of the refractive indices of the waveguide substrate and the base substrate.

Still further, it is preferable that the waveguide substrate and the base substrate are bonded by direct bonding. This enables bonding with high precision.

Still further, it is preferable that the waveguide substrate and the base substrate have refractive indices that are substantially equal to each other. This enables bonding with high precision for the bonding between the waveguide substrate and the base substrate. This particularly enables bonding with high precision in the case of the direct bonding.

Still further, the waveguide substrate and the base substrate may be bonded with a thin film layer interposed therebetween.

Still further, it is preferable that at least one of bonding between the waveguide substrate and the thin film layer and bonding between the base substrate and the thin film layer is direct bonding. This enables bonding with high precision.

Still further, it is preferable that an optical waveguide is formed in the waveguide substrate, the non-bonding region has a width not less than a width of a projection region defined by projecting the optical waveguide perpendicularly, and the projection region falls within the non-bonding region. This makes it possible to achieve enhanced waveguide characteristics without waveguide losses.

Still further, the optical waveguide may be a ridge optical waveguide.

Still further, the non-bonding region may be provided by forming a recess in a thickness direction on at least one of the waveguide substrate and the base substrate.

Still further, it is preferable that the non-bonding region has a thickness of not less than 0.01 μm. This makes it possible to achieve enhanced waveguide characteristics without waveguide losses.

Still further, it is preferable that a filler having a refractive index smaller than that of the waveguide substrate is provided in the non-bonding region. This makes it possible to achieve enhanced waveguide characteristics without waveguide losses.

Still further, it is preferable that the filler is an ultraviolet curable resin. This facilitates the production, and makes it possible to achieve enhanced waveguide characteristics without waveguide losses.

Still further, the filler may be a dielectric material.

Still further, the filler may be provided in contact with the waveguide substrate and at least in a projection region defined by projecting the optical waveguide perpendicularly.

Still further, it is preferable that a plurality of the non-bonding regions are provided, and are arranged at regular intervals. This increases the strength at the bonding surface.

Still further, a method for producing an optical element of the present invention includes the steps of: forming a recess on a principal surface of at least one of a waveguide substrate and a base substrate, the recess being to function as a non-bonding region; and bonding the waveguide substrate and the base substrate with each other so that the non-bonding region is interposed between the waveguide substrate and the base substrate. This makes it possible to produce an optical element having excellent waveguide characteristics, irrespective of refractive indices of the waveguide substrate and the base substrate.

Still further, it is preferable that in the recess forming step, the recess is formed on a principal surface of one of the waveguide substrate and the base substrate in a thickness direction. This makes it possible to produce an optical element having excellent waveguide characteristics, irrespective of refractive indices of the waveguide substrate and the base substrate, without employing a thin film.

Still further, it is preferable that the recess forming step includes a sub-step of forming a thin film on a principal surface of one of the waveguide substrate and the base substrate, and forming the recess in a thickness direction in the thin film. This makes it possible to produce an optical element in which the thin film and the waveguide substrate are in contact with each other. Therefore, it is possible to produce an optical element having excellent waveguide characteristics, irrespective of refractive indices of the waveguide substrate and the base substrate.

Still further, it is preferable that the bonding step includes sub-steps of: forming a thin film on the principal surface having the recess; smoothening the principal surface having the thin film thereon by a chemical mechanical polishing process; and bonding the waveguide substrate and the base substrate with each other by subjecting the principal surfaces thereof to direct bonding so that the non-bonding region is interposed between the waveguide substrate and the base substrate. This makes it possible to produce an optical element in which the thin film and the waveguide substrate are in contact with each other. Therefore, it is possible to produce an optical element having excellent waveguide characteristics, irrespective of refractive indices of the waveguide substrate and the base substrate.

Still further, it is preferable that the bonding step includes: forming the recess on the base substrate; forming a thin film on a principal surface of the waveguide; and bonding the waveguide substrate and the base substrate with each other so that the thin film falls within the non-bonding region. With this, it is unnecessary to polish the thin film layer, and therefore, it is possible to reduce the number of steps.

Still further, it is preferable that the method further includes the step of filling a filler having a refractive index smaller than a refractive index of the waveguide substrate in a gap formed by the recess between the waveguide substrate and the base substrate after the waveguide substrate and the base substrate are bonded. This makes it possible to produce an optical element in which the thin film and the waveguide substrate are in contact with each other. Therefore, it is possible to produce an optical element having excellent waveguide characteristics, irrespective of refractive indices of the waveguide substrate and the base substrate.

Still further, it is preferable that in the bonding step, the waveguide substrate and the base substrate are bonded by direct bonding. This makes it possible to produce an optical element with high bonding precision.

Still further, another method for producing an optical element of the present invention includes the steps of: forming recesses in a thickness direction on a base substrate so as to form a plurality of grooves arranged at regular intervals; stacking one base substrate on another by bonding them so that groove-formed surfaces of the base substrates face each other and that the grooves of one of the base substrates cross the grooves of the other base substrate, and polishing one of the base substrates until the grooves are exposed, so as to prepare a base substrate having a stacked structure; and repeating the stacking step with respect to the base substrate having a stacked structure. This makes it possible to produce a photonic crystal readily.

BRIEF DESCRIPTION OF THE DRAWINGS

FIG. 2A shows a measurement result of a surface roughness of a Ta oxide film formed by sputtering, and FIG. 2B shows a measurement result of a surface roughness of a $SiO_2$ film formed by sputtering.

DETAILED DESCRIPTION OF THE INVENTION

Figure 1:
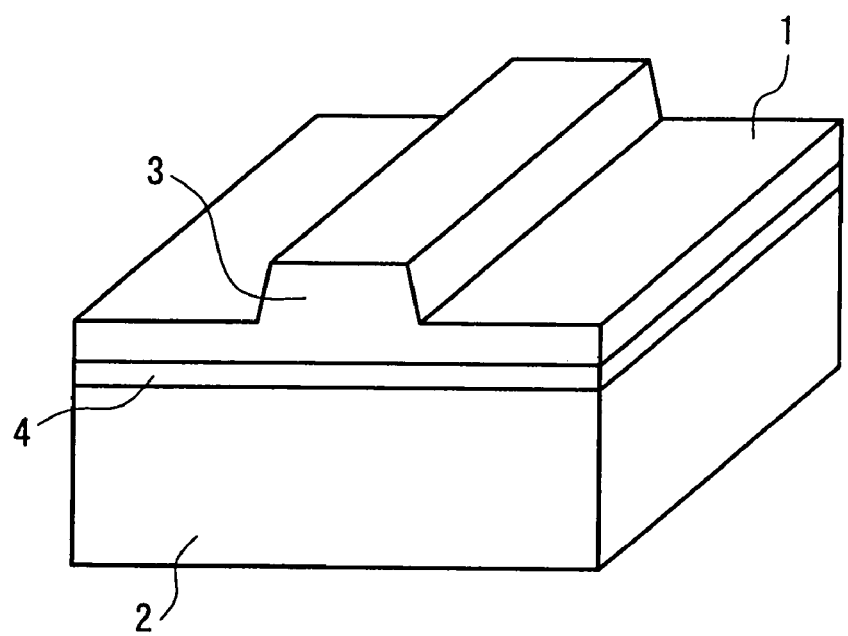
FIG. 1 is a perspective view illustrating a configuration of an optical element according to Embodiment 1 of the present invention.

The following will describe embodiments of the present invention. In the following description, an optical-waveguide-type element is taken as an example of an optical element. In the optical element, MgO-doped $LiNbO_3$ crystal (hereinafter abbreviated as MgO:LN crystal), which is a ferroelectric crystal, is used for forming a waveguide substrate in which an optical waveguide is formed, and LiNbO$_3$ crystal (hereinafter abbreviated as LN crystal) is used for forming a base substrate as a base of the optical element. However, the present invention is not limited to this configuration.

EMBODIMENT 1

The direct bonding technique is known as a technique for firmly bonding substrates without using an adhesive or the like, and it allows various materials such as glass, semiconductors, ferroelectrics, piezoelectric ceramics, etc. to be bonded with high precision. A directly bonded substrate pair draws attention as an effective means for producing an optical element, since one of the bonded substrates (the pair of substrates bonded), formed in a thin plate form and caused to have a ridge structure, can be used as an optical waveguide. Direct bonding processes, including both cases of direct bonding between substrates of a same kind and direct bonding between substrates of different kinds, have been performed with respect to substrates of various kinds of oxides such as LN crystal, LiTaO$_3$ crystal (hereinafter abbreviated as LT crystal), MgO:LN crystal, and sapphire. Further, examples of the direct bonding with a thin film interposed between substrates have been made public, in which a material such as SiO$_2$, SiN, low-melting glass, metal oxide, etc. is used for forming a thin film material.

An optical element according to Embodiment 1 is configured so that, for instance, a ferroelectric crystal substrate made of LiNb$_x$Ta$_{(1-x)}$O$_3$ ($0 \leq x \leq 1$) is bonded with another substrate with a thin film layer being interposed therebetween. As the foregoing thin film layer, particularly a thin film layer including a film made of Ta$_2$O$_5$ or Nb$_2$O$_5$ as a principal component is used. It should be noted that the expression of "made of Ta$_2$O$_5$ or Nb$_2$O$_5$ as a principal component" means that Ta$_2$O$_5$ or Nb$_2$O$_5$ is contained at a ratio of not less than 80%. Further, it is desirable that Ta$_2$O$_5$ or Nb$_2$O$_5$ is contained at a ratio of not less than 90%.

This configuration ensures high-precision control of a film thickness of the thin film layer. Therefore, it is possible to produce readily an optical element in which, for instance, a substrate of MgO:LN crystal as an example of LiNb$_x$Ta$_{(1-x)}$O$_3$ crystal is bonded with a LN crystal substrate so that MgO:LN with excellent resistance to optical damage functions as an optical waveguide. It should be noted that a ferroelectric crystal of LiNb$_x$Ta$_{(1-x)}$O$_3$ has optical nonlinearity, and the use of this crystal for forming an optical element makes it possible to provide an optical modulator or a wavelength converter utilizing the nonlinear optical effect.

Effects of the use of the film containing Ta$_2$O$_5$ or Nb$_2$O$_5$ as a principal component for forming the thin film layer were actually determined by the inventors of the present invention, and they are shown below. First, since a thermal expansion coefficient of the thin film layer is approximate to a thermal expansion coefficient of the LiNb$_x$Ta$_{(1-x)}$O$_3$ crystal substrate, the film does not exfoliate from the substrate even when subjected to high temperature. Further, a film with high smoothness can be achieved even by radio-frequency (RF) sputtering, which is a relatively simple film forming technique. Further, in a direct bonding process including a hydrophilicity-imparting treatment and a subsequent process for manufacturing an optical element, the film exhibits high chemical resistance and minimum deterioration during the treatment. Still further, the film has an excellent strength, and an excellent adhesiveness to a LiNb$_x$Ta$_{(1-x)}$O$_3$ crystal substrate. Therefore, direct bonding with high strength can be achieved.

Among metal oxides, Ta$_2$O$_2$ and Nb$_2$O$_5$ are particularly suitable as materials for forming a thin film layer for use in the direct bonding of a ferroelectric crystal of LiNb$_x$Ta$_{(1-x)}$O$_3$. Further, a Ta$_2$O$_5$ film has a refractive index lower than that of a Nb$_2$O$_5$ film, and lower than that of the LiNb$_x$Ta$_{(1-x)}$O$_3$ crystal substrate. Therefore, a Ta$_2$O$_5$ film is particularly suitable for producing an optical-waveguide-type element in which a LiNb$_x$Ta$_{(1-x)}$O$_3$ crystal substrate is used.

One of the advantageous effects of the direct bonding technique is that it allows substrates having different properties to be bonded firmly with each other with high precision, thereby making it possible to provide devices having various characteristics, and hence, the direct bonding of substrates of different kinds has a significant advantage. The simplest examples of the direct bonding of substrates of different kinds using ferroelectric crystals include, for instance, the direct bonding of glass with LN crystal or the direct bonding of glass with LT crystal. However, considering that the heat treatment at a temperature in a range of several hundred ° C. to approximately 1000° C. is carried out as a general direct bonding process, it is required that the substrates to be bonded have substantially equal thermal expansion coefficients. Therefore, a method of using materials having substantially equal thermal expansion coefficients and different refractive indices, such as LN crystal and MgO:LN crystal, is considered easier, as compared with the foregoing configuration (the direct bonding of glass with LN crystal, the direct bonding of glass with LT crystal).

The direct bonding of LN crystal with MgO:LN crystal has been proposed, and optical elements of an optical waveguide type formed using the same have been disclosed. In this case, LN crystal is used as an optical waveguide since it has a refractive index greater than that of MgO:LN crystal. Both of LN crystal and MgO:LN crystal are ferroelectric crystals having optical nonlinearity, and have substantially equal nonlinear optical constants. Further, a LN crystal optical waveguide often is used in the case of an optical modulator utilizing the nonlinear optical effect or in the case where wavelength conversion is performed with respect to long wavelengths, since LN crystal is inexpensive as compared with MgO:LN crystal. However, it is difficult to use a LN crystal optical waveguide in an optical-waveguide-type wavelength converter that converts a wavelength to a short wavelength of not more than 500 nm, since a local non-uniform change in the refractive index (the phenomenon generally referred to as optical damage) occurs upon irradiation of light.

On the other hand, MgO:LN crystal is known as a material with an excellent resistance to optical damage, and particularly is regarded as a promising material for use in a wavelength converter for conversion to short wavelengths. Therefore, in this case, MgO:LN crystal is used as optical waveguide preferably.

Thus, by the method, it is possible to form an optical element irrespective of refractive indices of respective substrates, from the standpoint of function and cost performance of the direct bond substrate.

It has been proposed to arrange an intermediate layer (thin film layer) made of SiO$_2$, SiN, low-melting glass, etc. between substrates, regarding an optical element to which the direct bonding is applied. For instance, JP06-289347A discloses a device manufactured by direct bonding, in which an intermediate layer made of a material having a refractive index lower than that of a substrate material for forming an optical waveguide, and a method for manufacturing the same.

This makes it possible to use MgO:LN crystal having a refractive index lower than that of LN crystal as an optical waveguide. In the case where low-melting glass is used for instance, however, a technique such that a glass material dissolved in a thinner or the like is applied over substrates to be bonded and thereafter the substrates are brought into close contact with each other, subjected to pressure and baked is used as a technique of direct bonding of low-melting glass with an intermediate layer. Therefore, a problem arises in that the control of the thickness uniformity of the low-melting glass is difficult. Further, a $SiO_2$ film or a SiN film formed by a simple method such as vapor deposition or sputtering cannot be subjected to direct bonding since it has an inferior surface smoothness.

Therefore, the inventors of the present invention focused on a dielectric thin film that allows for the thickness uniformity control, as a layer to be formed between substrates bonded directly, and examined characteristics thereof. As a result, they found that dielectric films containing $Ta_2O_5$ and $Nb_2O_5$ as principal components, for instance, are applicable.

The following will describe an optical element according to Embodiment 1 of the present invention, while referring to the drawings. FIG. 1 is a perspective view illustrating a configuration of the optical element according to Embodiment 1. As shown in FIG. 1, the optical element according to Embodiment 1 has a configuration in which a base substrate 2 and a waveguide substrate 1 are stacked with a thin film layer 4 interposed therebetween.

For instance, an X-cut MgO:LN crystal substrate is used as the waveguide substrate 1. An X-cut LN crystal substrate is used as the base substrate 2. Further, the waveguide substrate 1 is processed so as to have a ridge structure, whereby a ridge-type optical waveguide 3 is formed. The thin film layer 4 is a dielectric single-layer film containing $Ta_2O_5$ as a principal component.

A method for producing an optical element according to Embodiment 1 is described. First, the thin film layer 4 is formed on a principal surface of either the waveguide substrate 1 or the base substrate 2. The RF sputtering, for instance, may be used for forming the thin film layer 4, so that a $Ta_2O_5$ thin film as the thin film layer 4 is formed with a thickness of 100 nm to 400 nm on, for instance, the waveguide substrate 1 of MgO:LN crystal. Here, the refractive index of the thin film layer 4 containing $Ta_2O_5$ as a principal component varies with sputtering conditions. As actual measurement results, the refractive index varied in a range of 2.05 to 2.10 with respect to light having a wavelength of 623.8 nm. Since MgO:LN crystal as the waveguide substrate 1 has a refractive index of approximately 2.17 with respect to the light with the same wavelength, it is possible to cause the optical element according to Embodiment 1, when finished, to trap and guide light with a wavelength of 623.8 nm through the optical waveguide 3.

After the thin film layer 4 is formed on the waveguide substrate 1, a surface of the thin film layer 4 and a surface of the base substrate 2 of LN crystal, which are surfaces to be subjected to direct bonding, are subjected to a treatment for imparting hydrophilicity. More specifically, after the thin film layer 4 formed on the waveguide substrate 1 and the base substrate 2 are subjected to acetone ultrasonic cleaning, they are immersed in a mixture solution of ammonia water (aqueous ammonia), hydrogen peroxide, and deionized water at a ratio of 1:1:6 (hereinafter referred to as ammonia-hydrogen peroxide solution) for not less than fifteen minutes, rinsed with deionized water, and dried. It should be noted that normal ammonia water having a concentration of 20% to 40% may be used. Desirably, the ammonia water has a concentration of 30%.

Thereafter, the waveguide substrate 1 and the base substrate 2 are combined with each other so that the directions of the respective crystallographic axes of the waveguide substrate 1 and the base substrate 2 coincide with each other and that the surface of the thin film layer 4 and the surface of the base substrate 2 are brought into contact, and the substrates are subjected to a slight pressure. By so doing, the thin film layer 4 and the base substrate 2 are brought into close contact with each other. Further, by subjecting the base substrate 2 and the waveguide substrate 1 having the thin film layer 4 thereon to a heat treatment, the thin film layer 4 and the base substrate 2 are bonded directly. The heat treatment is carried out at 350° C. to 800° C., with use of an oven, at a temperature rising rate of, for instance, 100° C./h to 500° C./h for preventing the delamination of the bonded substrates and damages due to rapid temperature rise.

It should be noted that the direct bonding is a technique for firmly bonding two substrates without using an adhesive, a resin, or the like. For instance, in the foregoing method, the substrates are brought into close contact with each other by hydrogen bonds of OH groups. Therefore, the substrates are brought into a further firm bonding state by a further heat treatment, since the OH groups form $H_2O$ molecules and leave the bonding surface (dehydration). Further, apart from this method, there is another direct bonding method utilizing electrostatic attraction.

To form the optical waveguide 3 in the paired substrates thus formed by direct bonding (hereinafter sometimes referred to as a direct-bond substrate), the waveguide substrate 1 is subjected to surface polishing and thinning, so as to finally have a thickness of 3 μm to 4 μm. Thereafter, an optical waveguide patterning is carried out by photolithography, and a ridge of 1.5 μm to 2 μm is formed by dry-etching on the surface of the waveguide substrate 1 thus thinned. Thus, the ridge-type optical waveguide 3 is formed. It should be noted that both end faces (entrance and outgoing faces) of the optical waveguide 3 are subjected to mirror-finishing after the ridge is formed.

Here, the thin film layer 4 is described in more detail. Generally, it is known that in the case where a dielectric film is formed on a substrate by sputtering, vapor deposition, etc., characteristics of the film thus formed vary depending on film forming conditions (temperature, ambient atmosphere for the film formation, etc.). Besides, it is known that a surface state (surface roughness) of a film significantly varies depending on a film forming method including a film forming device. For instance, depending on the technique applied, such as vapor deposition, RF sputtering, electron-cycrotron-resonance (ECR) sputtering, or CVD, and a device used, the film formed has different homogeneity, density, and surface roughness. Still further, it is known that even when the same method is used, the use of a different material results in a different surface state.

However, in the optical element according to Embodiment 1, when the thin film layer 4 and the base substrate 2 are bonded, the surface roughness of the thin film layer 4 formed on the waveguide substrate 1 affects the bonded state. For instance, in the case where the surface is significantly rough, the optical element has deteriorated precision. In the case where the thin film layer 4 and the base substrate 2 are to be bonded directly in particular, an excessive roughness of the surface of the thin film layer 4 makes the direct bonding impossible. For instance, it is known that direct bonding cannot be used with respect to a $SiO_2$ film formed by RF sputtering or ECR sputtering since it has a significantly rough surface. In light of these experiment results, generally the direct bonding employing a dielectric film formed by sputtering is not carried out. However, as in the present invention, in the case where the thin film layer 4 is a single-layer or multi-layer thin film containing $Ta_2O_5$ or $Nb_2O_5$ as a principal component, the thin film layer 4 has a surface with an extremely small roughness even if it is formed by sputtering, and hence, it has a roughness precision required for the direct bonding.

Figure 2A:
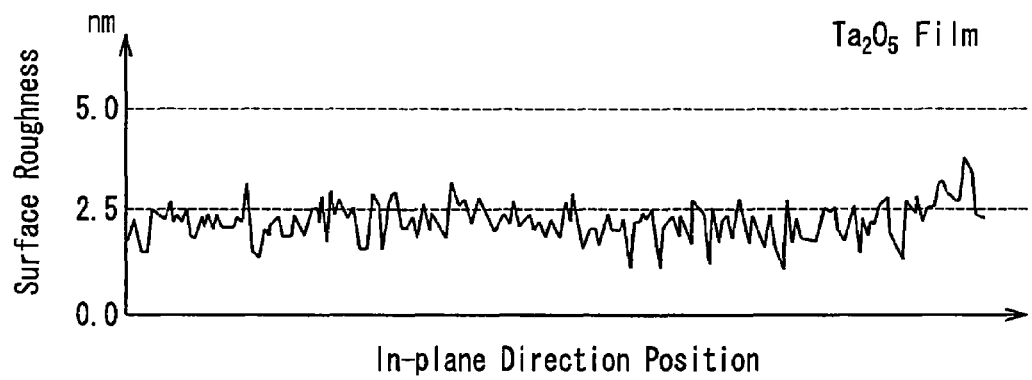
FIGS. 2A and 2B are views showing measurement results of surface roughness of films formed by sputtering, which were measured by an atomic force microscope.
Figure 2B:
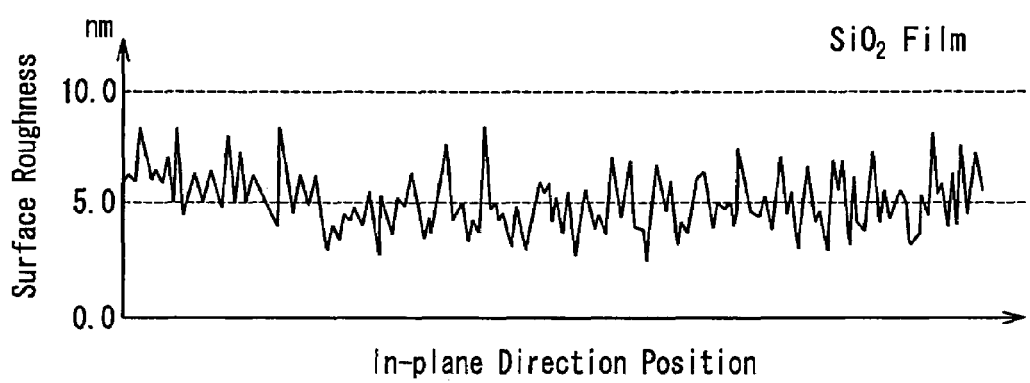

FIGS. 2A and 2B are views showing roughnesses of surfaces of films formed by sputtering. FIG. 2A shows a measured result of a surface roughness of a Ta oxide film formed by sputtering (target as sputtering source is $Ta_2O_5$), and FIG. 2B shows a measured result of a surface roughness of a $SiO_2$ film formed by sputtering, both of which were measured by an atomic force microscope. As seen in FIGS. 2A and 2B, the surface roughness (maximum: approximately 2 nm) of the Ta oxide is considerably smaller than the surface roughness of $SiO_2$ (maximum: approximately 6 nm). A surface roughness at an equal level of that of the Ta oxide film formed by sputtering can be obtained with, for instance, a niobium oxide film formed by sputtering (target as sputtering source is $Nb_2O_5$), but the niobium oxide film has a refractive index of 2.25 to 2.35 with respect to light having a wavelength of 632.8 nm, which is greater than that of MgO:LN crystal. Therefore, in the case where the waveguide substrate 1 is MgO:LN crystal, light cannot be trapped, and the optical waveguide 3 cannot be formed. However, in the case where a material having a further higher refractive index, for instance, a semiconductor material such as a silicon wafer, is used for forming the waveguide substrate 1, it is possible to use a niobium oxide for forming the thin film layer 4. The thin film layer 4 is made to have a refractive index lower than that of the waveguide substrate 1, and a suitable one may be selected from a dielectric film containing $Ta_2O_5$ as a principal component and a dielectric film containing $Nb_2O_5$ as a principal component, depending on a material used for forming the waveguide substrate 1.

Furthermore, a dielectric film containing $Ta_2O_5$ or $Nb_2O_5$ as a principal component has been proved experimentally to have a high chemical resistance. This is a necessary property for the direct bonding. For instance, the above-described ammonia-hydrogen peroxide treatment for imparting hydrophilicity is carried out for the direct bonding, and the $SiO_2$ film formed by sputtering is not suitable as the thin film layer 4 for direct bonding since the ammonia-hydrogen peroxide solution erodes the film and further deteriorates the in-plane uniformity of the film thickness. On the other hand, a dielectric film containing $Ta_2O_5$ or $Nb_2O_5$ as a principal component is not eroded by the ammonia-hydrogen peroxide solution, and has a strong resistance against an organic solvent or a buffered hydrogen fluoride (a mixture solution of hydrogen fluoride:ammonium fluoride:water=1:5:50), which are used in other processes.

Here, a result obtained regarding an optical element according to Embodiment 1 is shown below, which was produced actually by using, as the thin film layer 4, a dielectric film containing $Ta_2O_5$ as a principal component. A pair of substrates directly bonded with the thin film layer 4 containing $Ta_2O_5$ as a principal component being interposed therebetween did not exhibit delamination or deterioration in a process subsequent to the direct bonding (the thinning and polishing, photolithography, dry-etching, and end face polishing process with respect to the waveguide substrate 1 made of MgO:LN crystal), and an extremely excellent bonded state was maintained. Particularly, the strength of the $Ta_2O_5$ film formed by sputtering as the thin film layer 4 and the adhesion thereof to the waveguide substrate 1 were reinforced by the film formation in an atmosphere at a temperature of not lower than 100° C. as the sputtering condition, and an effect was achieved in preventing the delamination or deterioration of the bonding surface and the sputtered surface upon the thinning and polishing process.

Further, waveguide characteristics of the optical waveguide 3 formed were excellent, and a sufficient light trapping effect and waveguiding with low losses were observed. Furthermore, in order to form a single-mode optical waveguide 3, it is necessary to control the refractive index of the thin film layer 4 and to control the shape of the optical waveguide 3 precisely. The use of a material having a refractive index approximate to that of MgO:LN crystal of the waveguide substrate 1, as a dielectric material containing $Ta_2O_5$ as a principal component, makes it possible to achieve an effect of significantly increasing the design tolerance for designing the optical waveguide.

Not only in the case where a dielectric film containing $Ta_2O_5$ as a principal component is used as the thin film layer 4, but also in the case where a dielectric film, containing $Nb_2O_5$ as a principal component is used as the thin film layer 4, an extremely excellent bonded state of direct bonding was maintained. Further, the waveguiding of light through the optical waveguide 3 was excellent. It should be noted that $Nb_2O_5$ has a refractive index higher than that of $Ta_2O_5$, and a suitable material may be selected from these materials according to the material used for forming the waveguide substrate 1.

So far the case where a dielectric single-layer film containing $Ta_2O_5$ as a principal component is used as the thin film layer 4 has been described, but a multi-layer film containing $Ta_2O_5$ as a principal component may be used as the thin film layer 4. Films with different refractive indices can be formed by varying a film forming atmosphere for forming the dielectric film (flow rates of Ar gas and $O_2$ gas, a pressure inside a chamber of a sputtering device, etc.), or varying a film forming temperature or a voltage that the sputtering device applies. For instance, on the waveguide substrate 1 made of MgO:LN crystal (having a refractive index of 2.17 with respect to light having a wavelength of 632.8 nm), thin films containing, as their principal components, two kinds of $Ta_2O_5$ which have refractive indices of 2.05 and 2.10, respectively, with respect to light having a wavelength of 632.8 nm may be formed so as to compose a multi-layer film. The thin films in contact with the waveguide substrate 1 and the base substrate 2 are made to have a refractive index of 2.05. A thin film of one of the kinds that has a refractive index of 2.05 and a thin film of the other kind that has a refractive index of 2.10 may be formed alternately so that the former has a thickness of 77 nm and the latter has a thickness of 75 nm. A multi-layer film composed of nine layers thus formed as the thin film layer 4 has a reflectance of 2.3%, while a multi-layer composed of nineteen layers as the thin film layer 4 has a reflectance of 7.1%. In other words, as the layers increase in number, the reflectance increases. On the other hand, a single-layer film containing $Ta_2O_5$ as a principal component has a reflectance of 0.32%. Thus, a reflectance of not less than ten times the reflectance of the single-layer film can be obtained easily.

Likewise, a multi-layer film made of a niobium oxide, or a multi-layer film made of a Ta oxide or a niobium oxide, can be subjected to direct bonding as the thin film layer 4. By so doing an optical waveguide-type element suffering from low losses and having a sufficient light trapping effect can be produced. In the case where a multi-layer film made of a Ta oxide and a niobium oxide is used, for instance, the film may have a configuration in which a Ta oxide film layer having a lower refractive index is formed so as to be in contact with the optical waveguide 3, and the thin film layer 4 is formed using a niobium oxide film layer having a higher refractive index on the other side, so that the base substrate 2 and the niobium oxide film layer are bonded directly. With this configuration, it is possible to control the light-trapping state so that a desirable state thereof can be achieved.

Further, the thin film layer 4 may have a multi-layer structure including a film containing $Ta_2O_5$ or $Nb_2O_5$ as a principal component and a metal layer made of a metal material. For instance, the thin film layer 4 may have a metal layer on its surface to be subjected to direct bonding.

Reflected light from a rear face of the direct-bond substrate appears as noise components with respect to interference fringes formed by reflected light from a front face of the waveguide substrate 1 and reflected light from the thin film layer 4. For instance, in the case where dust is mixed in or an adhesive is applied unevenly when the waveguide substrate 1 is attached to a holding table that is used in the polishing work, interference fringes sometimes are observed that are caused by reflected light from a rear face of the direct-bond substrate (a face of the direct-bond substrate in contact with the holding table) and reflected light from a surface of the waveguide substrate 1 since the rear face of the direct-bond substrate is tilted with respect to the surface to be polished. These interference fringes hinder the observation of interference fringes due to reflected light from the thin film layer 4 and reflected light from a surface of the substrate thinned, which should be observed. To cope with this problem, a metal layer is arranged as an intermediate layer for direct bonding, so that such noise components are removed, while the thinning of the substrate to be thinned can be facilitated.

Figure 3:
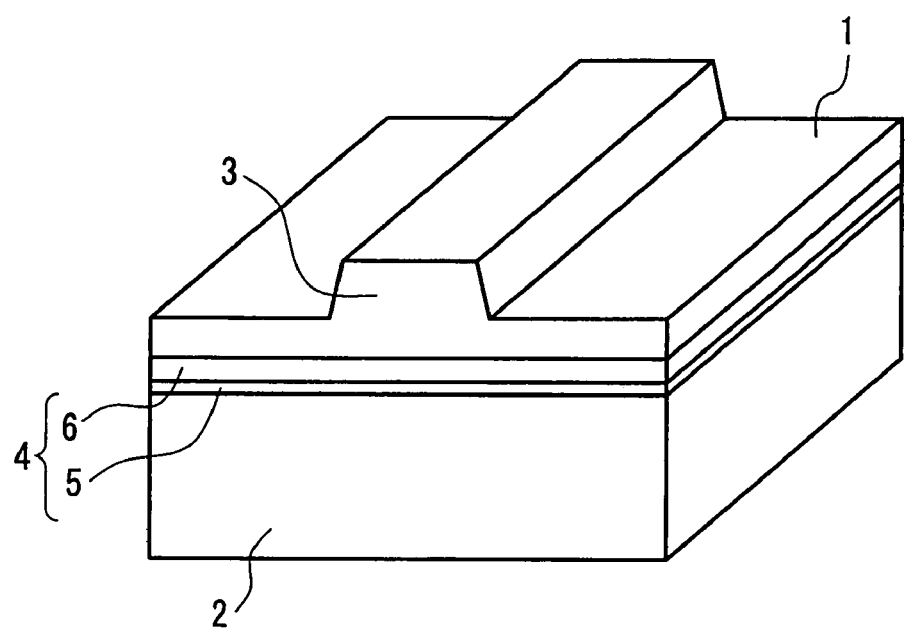
FIG. 3 is a perspective view illustrating another configuration of an optical element according to Embodiment 1 of the present invention.

As shown in FIG. 3, the thin film layer 4 is formed on the base substrate 2, and the waveguide substrate 1 having the ridge-type optical waveguide 3 is formed thereon. The thin film layer 4 is composed of a metal layer 5 made of a metal material such as Ta and a dielectric layer 6 containing $Ta_2O_5$ or $Nb_2O_5$ as a principal component. For instance, the metal layer 5 is formed on the base substrate 2 side, while the dielectric layer 6 is formed on the waveguide substrate 1 side. It should be noted that the optical element is manufactured by forming the thin film layer 4 on the base substrate 2 that is an X-cut LN crystal substrate, thereafter, bonding the waveguide substrate 1 that is an X-cut MgO:LN crystal substrate and the thin film layer 4 with each other by direct bonding, and forming the optical waveguide 3 in the waveguide substrate 1. A Ta film, for instance, is used as the metal layer 5 of the thin film layer 4, while a single-layer film containing $Ta_2O_5$ as a principal component is used as the dielectric layer 6. It should be noted that any metal may be used for forming the metal layer 5, as long as the same effect as that described above can be achieved.

Strong bonding by direct bonding cannot be achieved at an interface between the metal layer 5 and the waveguide substrate 1 made of MgO:LN crystal that is a ferroelectric crystal, or an interface between the metal layer 5 and the base substrate 2 made of LN crystal. On the other hand, the dielectric layer 6 composed of a single-layer film containing $Ta_2O_5$ as a principal component and the waveguide substrate 1 can be bonded excellently by direct bonding. Therefore, they are bonded directly. Here, if the metal layer 5 is excessively close to the optical waveguide 3, this causes absorption losses of guided light. For instance, with an excessive power of guided light, damage to the optical element possibly occurs. Therefore, it is necessary to separate the metal layer 5 from the optical waveguide 3 with at least a distance corresponding to the evanescent range of guided light. A distance of not less than 50 nm is sufficient between the metal layer 5 and the waveguide substrate 1. It should be noted that the evanescent range is a range in which light propagating through an optical waveguide leaks out. If the metal layer 5 is arranged in this range, guided light possibly is affected by the metal layer 5 and causes damage to the optical element.

In the manufacture of an optical element by direct bonding, first, the metal layer 5 and the dielectric layer 6 are formed successively by RF sputtering on the base substrate 2. The metal layer 5 and the dielectric layer 6 are formed to as to have a thickness of 5 nm to 100 nm, and a thickness of 10 nm to 200 nm, respectively.

Thereafter, the thin film layer 4 and the waveguide substrate 1 are bonded directly as described above, and the optical waveguide 3 is formed. In this optical element, a distance between the metal layer 5 and the optical waveguide 3 (waveguide substrate 1) is equal to a thickness of the dielectric layer 6. In the case where this thickness was not less than 50 nm, the optical element had excellent waveguide characteristics, and a sufficient light trapping effect and the waveguiding with low losses were observed.

Figure 4A:
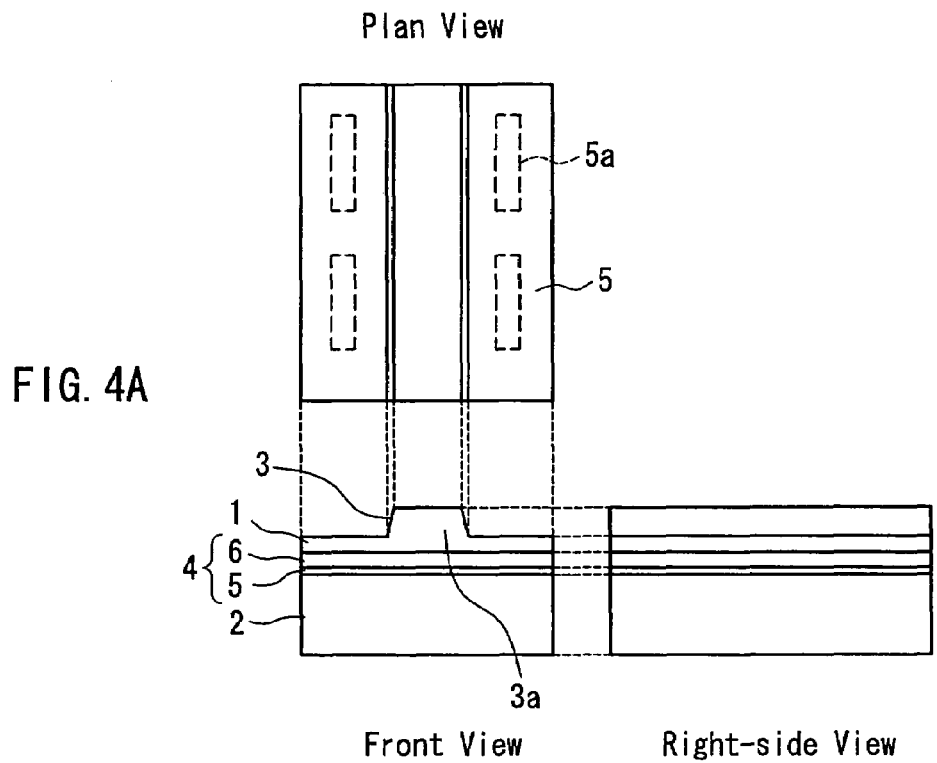
FIGS. 4A and 4B are orthographic drawings by the third angle projection method of the optical element shown in FIG. 3.
Figure 4B:
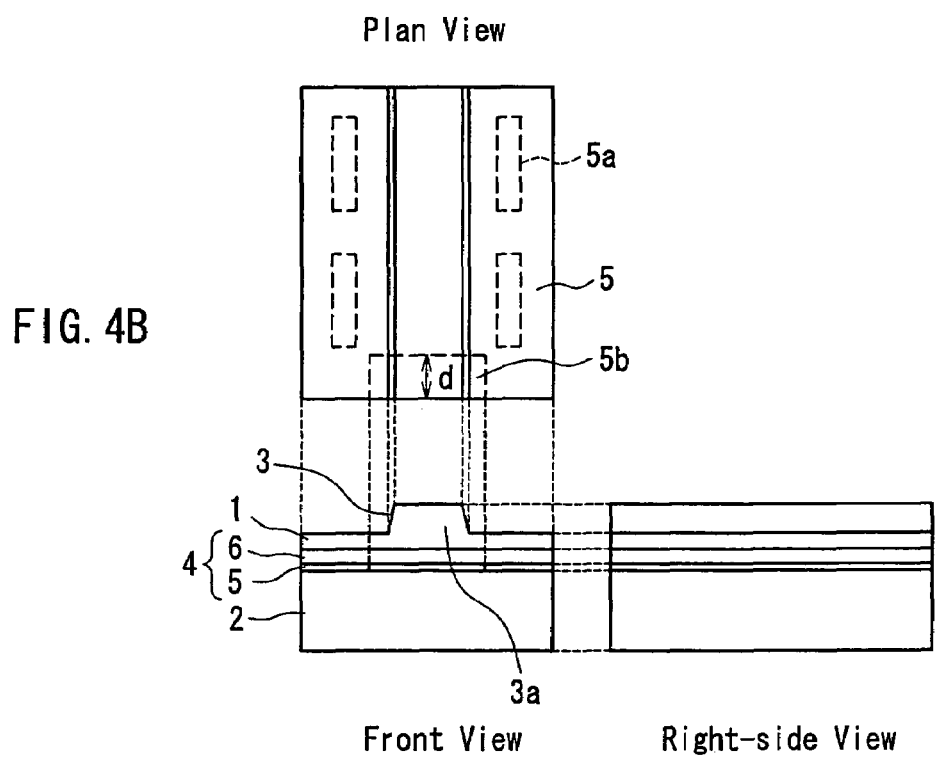

FIGS. 4A and 4B are orthographic drawings by the third angle projection method of the optical element shown in FIG. 3. As shown in a plan view of FIG. 4A, the metal layer 5 is not formed over an entirety of the surface of the bond substrate, but formed by patterning so that metal-removed portions 5a where the metal layer 5 is not formed are present. It should be noted that the metal layer 5 actually is covered with the thin film layer 6 and the waveguide substrate 1 laminated thereon, but FIG. 4A shows the metal layer 5 as if it were seen through the same.

By patterning the metal layer 5 as shown in FIG. 4A, the positioning of the optical waveguide 3 when it is formed is facilitated. More specifically, the metal-removed portions 5a are utilized as markers when the positioning is carried out. This enables the highly precise mounting of the optical element. The optical waveguide 3 of the optical element made of LN crystal or MgO:LN crystal that are used for forming the waveguide substrate 1 and the base substrate 2 have waveguide losses dependent on the crystallographic axis directions thereof. For instance, in the case where the optical waveguide 3 for transmission in the Y-axis direction is formed using a X-cut substrate of LN crystal, the waveguide losses increase greatly if the waveguide is formed in a direction tilted at an angle of several degrees from the Y axis. Accordingly, it is important to direct the optical waveguide 3 in a direction such that desired characteristics are obtained, with the crystallographic axis direction taken into consideration.

Furthermore, in the case where a wavelength converter is produced using the optical waveguide 3 in particular, it is necessary to form a periodic polarization reversal structure in which the polarization direction of crystal is inverted cyclically so as to increase a wavelength conversion efficiency. It is known that LN crystal polarized to have a single polarity has a polarization direction in a C-axis direction (=Z-axis direction) of the crystal, and by applying a high-voltage electric field using periodic electrodes, for instance, the foregoing cyclic polarity inversion can be achieved. For the wavelength conversion, the oscillation direction and polarization direction of a light wave preferably coincide with each other. Therefore, to perform the high-efficient wavelength conversion, the cyclic polarity inversion structure and the optical waveguide 3 preferably are formed so as to cross orthogonally. Thus, in the manufacture of an optical element in which a direct-bond substrate is used, for instance a wavelength converter, it is necessary to specify the crystallographic axis direction.

The conventional optical waveguide manufactures did not have a technique for specifying a direction of a crystal substrate. Therefore, it was necessary to form positioning-use markers, for instance, by laser marking on a rear face of a direct-bond substrate (a face opposite to the optical waveguide-formed face). However, by bonding the waveguide substrate 1 and the base substrate 2 with the thin film layer 4 including the patterned metal layer 5 being interposed therebetween, the positioning-use markers are unnecessary. More specifically, the thin film layer 4 including the patterned metal layer 5 is formed on the base substrate 2, and when the waveguide substrate 1 is arranged thereon, the bonding is performed by referring to the metal-removed portions 5a formed by the patterning. By so doing, the crystallographic axis directions are made to coincide with each other.

Furthermore, the metal layer 5, formed in the vicinity of a light-incident end 3a of the optical waveguide 3, tends to cause damage to the element due to light absorption with respect to light when light from a laser is coupled with the optical waveguide 3. Therefore, as shown in FIG. 4B, it is effective to provide a metal removed portion 5b in the vicinity of the light-incident end 3b of the optical waveguide 3. According to actual measurement, the absence of a metal layer at least in a range of 1 μm from a surface of the light-incident end 3a of the optical waveguide 3 was sufficient. In other words, the metal-removed portion 5b preferably has a depth d of not less than 1 μm.

Embodiment 1 is described by referring to a case where an optical element is produced by directly bonding a ferroelectric crystal substrate made of $LiNb_xTa_{(1-x)}O_3$ with another crystal substrate, with the thin film layer 4 being interposed between the substrates, the thin film layer 4 being a dielectric film containing $Ta_2O_5$ or $Nb_2O_5$ as a principal component. However, even in the case where a substrate other than the $LiNb_xTa_{(1-x)}O_3$ substrate is used, for instance, in the case where the direct bonding is performed with respect to a Si wafer or a $SiO_2$ substrate with the interposition of the thin film layer, the use of the thin film layer 4 that is a dielectric film containing $Ta_2O_5$ or $Nb_2O_5$ as a principal component is effective, since it has high smoothness and high chemical resistance.

EMBODIMENT 2

An optical element according to Embodiment 2 is configured so as to allow highly precise evaluation of substrate thickness uniformity to be performed when one of the substrates to be bonded with a thin film interposed therebetween is thinned. The following will describe in detail what enables the thinning of the substrate for achieving a high thickness uniformity. It should be noted that Embodiment 2 is described referring to an example of the manufacture of an optical element in which a thinned substrate is used. The optical element of the present embodiment is formed by directly bonding substrates made of LN crystal and MgO:LN crystal, in which the substrate made of MGO:LN crystal is thinned and an optical waveguide is formed therein. However, the present invention is not limited to an optical element of this configuration and of an optical waveguide type, and the bonding method is not limited to the direct bonding.

Many techniques for forming an optical waveguide in LN crystal or MgO:LN crystal have been proposed. For instance, as a method for forming an optical waveguide in a wavelength converter utilizing non-linear optical characteristics of LN crystal or MgO:LN crystal, the proton exchange method and the titanium diffusion method have been proposed. However, it is known that these methods entail deterioration of non-linear optical constants since they utilize refractive index variation caused by implantation of impurities in the crystal. On the other hand, an optical waveguide-type element employing bonded substrates has an advantage of not deteriorating the characteristics of the crystal in principle, since it has a light trapping effect in the substrate thickness direction by utilizing a difference between refractive indices of the substrates bonded, and an optical waveguide is formed only by changing a shape of the direct-bond substrate. Therefore, this technique can be considered significantly effective as a technique for producing an optical waveguide device that utilizes the non-linear optical effect as described above.

Generally, the optical waveguide-type element formation is required to achieve high uniformity of an optical waveguide shape (thickness and width). In an optical waveguide-type wavelength converter having a cyclic polarity inversion structure particularly, wavelength conversion of high efficiency is achieved in the case where phase matching between input fundamental and harmonic is achieved uniformly throughout the optical waveguide. Since the phase matching wavelength is determined according to a polarity inversion period and effective refractive indices of fundamental and harmonic, the conversion efficiency significantly decreases when the optical waveguide shape (width and height) varies with respect to a waveguiding direction. The optical waveguide width depends on the precision of patterning of the photoresist that is used as an etching mask, for instance, in the case where a ridge-type optical waveguide is formed by dry-etching. Therefore, high precision of a submicronic level is enabled.

On the other hand, the control of the height of the optical waveguide is achieved by the thinning of a substrate by polishing, for instance, where, however, the control of the height at a submicronic level is difficult. The reason is that simple methods for measuring an absolute value of a height and uniformity of the same are limited, and the available methods are the thickness absolute value measuring method using a level difference meter and the uniformity evaluating method of projecting light to the substrate and measuring reflected lights from a front face and a rear face of a direct-bond substrate by an interferometer. To form an optical waveguide in MgO:LN crystal in directly bonded substrates made of MgO:LN crystal and LN crystal, respectively, as shown in Embodiment 1 in particular, the direct bonding utilizing a thin film layer interposed is effective. However, with a thin film layer that has been proposed, sufficient reflected light cannot be obtained from a thin film layer on a rear face of a substrate to be thinned, and the uniformity evaluation with use of an interferometer cannot be carried out. Therefore, it is difficult to achieve highly precise uniformity.

The following will describe an optical element according to Embodiment 2, while referring to the drawings. Since an optical waveguide is formed by substrates directly bonded with a thin film interposed therebetween as shown in Embodiment 1, a substrate to be thinned, among the substrates to be bonded, desirably has a thickness with highly precise uniformity. The optical element according to Embodiment 2 is an optical element that enables highly precise evaluation of a thickness of a substrate where an optical waveguide is formed, and that therefore enables the thinning with high thickness uniformity. It should be noted that Embodiment 2 is described referring to an optical element employing a thinned substrate. In the optical element, LN crystal is used for forming a base substrate, MgO:LN crystal is used for forming a waveguide substrate, these base substrate and waveguide substrate are bonded with a thin film layer interposed therebetween, the waveguide substrate is thinned, and an optical waveguide is formed. However, the materials and configuration of the optical element are not limited to these described herein.

In an optical element according to Embodiment 2 configured by bonding substrates with a thin film layer interposed therebetween, a waveguide substrate to be thinned is transparent with respect to light having a specific wavelength λ and has a refractive index $n_1$ with respect to the specific light with a wavelength λ. A base substrate bonded with the waveguide substrate via the thin film layer has a refractive index $n_2$ with respect to the light having a wavelength λ. Further, the thin film layer used as an intermediate layer between the waveguide substrate and the base substrate has a refractive index $n_3$ ($\neq n_1, \neq n_2$) with respect to the light having a wavelength λ and a thickness T satisfying the relationship T≠(k×λ)/(2×$n_3$) where k represents a natural number. The satisfaction of the foregoing conditions makes it possible to determine uniformity of the waveguide substrate by utilizing a highly precise uniformity of the thickness of the thin film layer and reflected light from the thin film layer, and to perform the thinning of the waveguide substrate. More specifically, interference fringes caused by reflected light from a surface of the waveguide substrate to be thinned and reflected light from the thin film layer are observed, whereby the thickness uniformity determination of the crystal substrate is enabled. By so doing, an optical element having a thinned substrate with a high uniformity is provided. An optical waveguide-type element is produced by making the thinned substrate have a ridge structure.

Figure 5:
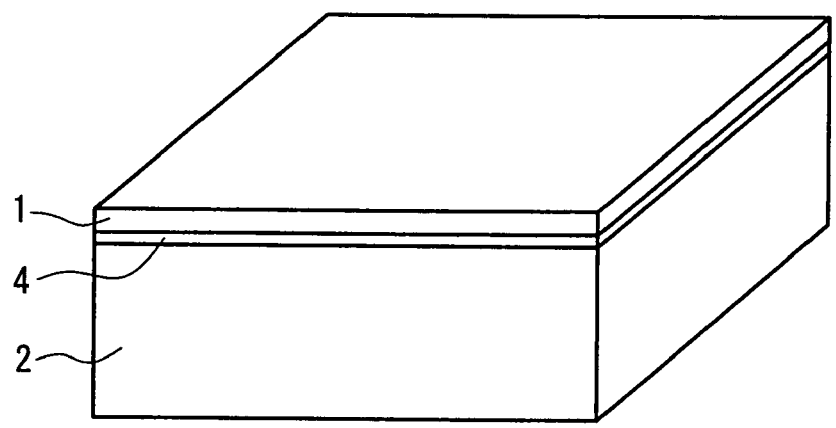
FIG. 5 is a perspective view illustrating an optical element according to Embodiment 2 of the present invention.

FIG. 5 is a perspective view illustrating a structure of an optical element according to Embodiment 2 of the present invention. An example of an optical element is shown, which is formed by bonding a MgO:LN crystal substrate and a LN crystal substrate with a thin film layer interposed therebetween. In FIG. 5, an X-cut MgO:LN crystal substrate as a base substrate 2 and an X-cut LN crystal substrate as a waveguide substrate 1 are bonded with each other with a thin film layer 4 interposed therebetween. It should be noted that the waveguide substrate 1 and the thin film layer 4 are bonded by direct bonding. More specifically, the thin film layer 4 is formed on the base substrate 2 by sputtering or the like, and the thin film layer 4 that is a dielectric single-layer film containing $Ta_2O_5$ as a principal component is bonded directly with the waveguide substrate 1 that is the X-cut LN crystal substrate. It should be noted that a state like this in which the waveguide substrate 1 and the base substrate 2 are bonded with the thin film layer 4 interposed therebetween is referred to as a direct-bond substrate. Thereafter, the waveguide substrate 1 of the direct-bond substrate is thinned, whereby an optical element is produced. It should be noted that the thin film layer 4 is a dielectric single-layer film containing $Ta_2O_5$ as a principal component.

In the case where the waveguide substrate 1 of the direct-bond substrate is thinned by polishing, it is necessary to make the thickness of the thinned waveguide substrate uniform. To achieve this, it is required to maintain several factors highly precisely, for instance, apart from the parallelism (uniformity of thickness) of the direct-bond substrate, the surface smoothness precision of a holding table for holding the direct-bond substrate so that it does not move when being polished, the adhesion uniformity of the direct-bond substrate with the holding table, the film thickness uniformity of the thin film layer 4, etc.

To ensure that the waveguide substrate 1 after being thinned has less thickness non-uniformity, a waveguide substrate 1 and a base substrate 2 that have high degrees of parallelism should be used. Further, upon polishing, the parallelism of the holding table on which the direct-bond substrate is caused to adhere is secured. Still further, since the direct-bond substrate is polished in a state of adhering to the holding table with an adhesive, the non-uniformity of thickness of the adhesive unavoidably results in the non-uniformity of thickness of the thinned waveguide substrate. To prevent this, a thermosetting adhesive, for instance, is applied uniformly over a rear face of the direct-bond substrate by spin-coating or the like, and the direct-bond substrate is made to adhere to the holding table by applying pressure and heat thereto. However, even with this process, distortion of the direct-bond substrate due to this adhesion occurs though it is slight. Therefore, even if the thinning is carried out by referring to the rear face of the direct-bond substrate (the surface at which the holding table and the direct-bond substrate are brought into contact) as a reference, non-uniformity of the thickness occurs. Therefore, the following method is used further.

Generally, in the case where the waveguide substrate 1 is transparent, the interference fringe observing method, which is a simple and highly precise optical technique, is available for determining thickness uniformity. The method of observing interference fringes is a method for determining a thickness uniformity of a substrate by projecting, for instance, a laser with a wavelength of 633 μm to a surface of a substrate and observing a state of interference between light reflected from the substrate surface and reflected light from a surface of a thin film layer beneath the substrate surface. In the case where the thickness varies, interference fringes occur. Thus, the thickness non-uniformity can be determined easily. However, in the case of the thinning of the waveguide substrate 1 of the direct-bond substrate with the thin film layer 4, it is difficult to observe interference fringes since the reflected light from the thin film layer 4 is weak.

Figure 6:
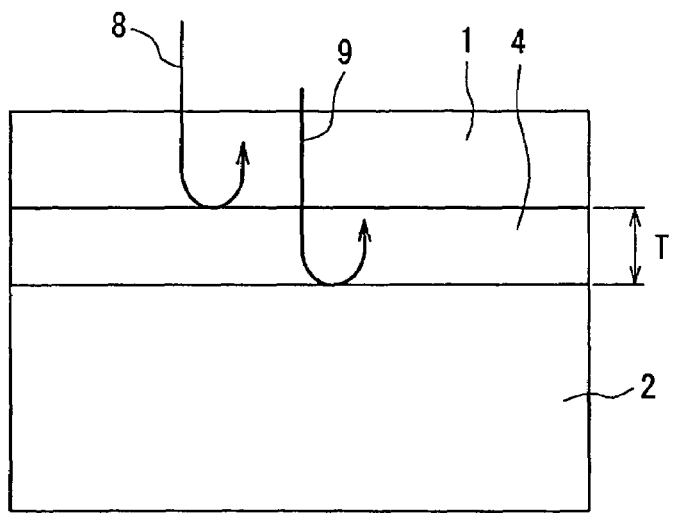
FIG. 6 is a view for explaining reflected lights from respective surfaces of a thin film layer.
Figure 7:
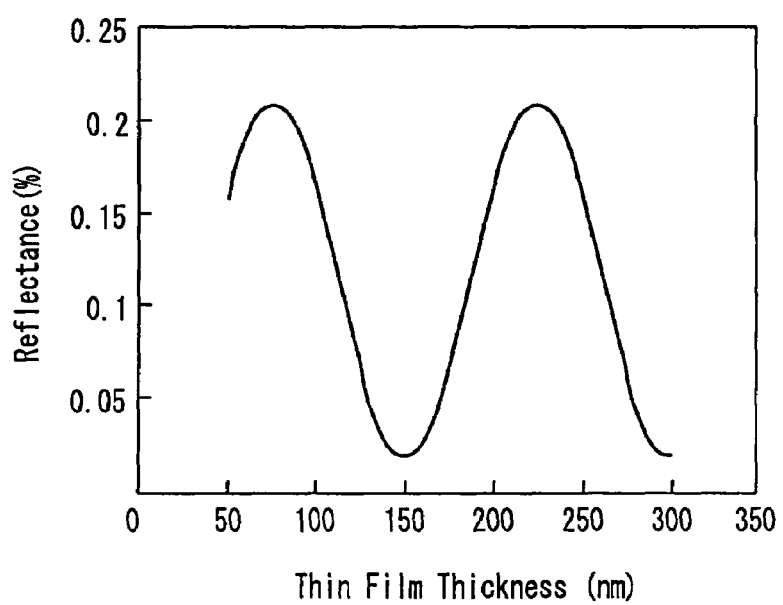
FIG. 7 is a graph showing a relationship of a light reflectance R with respect to a thickness T of the thin film layer.

Therefore, the optical element according to Embodiment 2 has a configuration such that the reflected light from the thin film layer 4 has a sufficient intensity. FIG. 6 explains reflected lights on respective surfaces of the thin film layer 4. FIG. 7 illustrates the relationship of a light reflectance R with respect to a thickness T of the thin film layer 4. In FIG. 6, reflected light 8 is light reflected at an interface between the thin film layer 4 and the waveguide substrate 1, and reflected light 9 is light reflected at an interface between the thin film layer 4 and the base substrate 2. Generally, a reflectance R of Fresnel reflection at a medium interface between two media having refractive indices of $n_a$ and $n_b$, with respect to light that is incident perpendicularly from the medium with $n_a$ to the medium with $n_b$ is expressed as:

$$R=|(n_a-n_b)/(n_a+n_b)|^2 \times 100(\%)$$

Calculated values are shown below in the case where, for instance, the waveguide substrate 1 is a MgO:LN crystal substrate, the base substrate 2 is a LN crystal substrate, and the thin layer 4 is $Ta_2O_5$. For instance, assuming that the waveguide substrate 1 has a refractive index of 2.166, the thin film layer 4 has a refractive index of 2.10, and the base substrate has a refractive index of 2.23 with respect to light with a wavelength of 632.8 nm, the reflectance R is calculated by the foregoing formula. The result of the calculation proves that reflectances R are very small, with a reflectance R at an interface between the waveguide substrate 1 and the thin film layer 4 being 0.024%, and a reflectance R at an interface between the base substrate 2 and the thin film layer 4 being 0.09%. Here, if the reflected light is too weak, the observation of interference fringes by reflected lights is impossible. Regarding this, the thickness T may be set so as to satisfy the following condition:

$$T \neq (k \times \lambda)/(2 \times n_3)$$

where λ represents a wavelength of light, $n_3$ represents the refractive index of the thin film layer 4, and k represents a natural number. By so doing, the reflected light 8 and the reflected light 9 interfere with each other, and the reflected light from the thin film layer 4 is increased consequently.

In the case where, for instance, light from a light source used for the interference fringe observation has a wavelength λ of 632.8 nm and the thin film layer 4 ($Ta_2O_5$) has a refractive index $n_3$ of 2.1 with respect to the wavelength λ, as clear from FIG. 7, the thin film layer 4 having a thickness T of 150.67 nm or a multiple of this value has a reflectance of substantially 0%, which means that no light is reflected from the thin film layer 4. Therefore, if the thickness T deviates from these values, the reflected light increases.

The ideal case is such that the thickness T of the thin film layer 4 and the natural number k satisfy:

$$T = (2k-1) \times \lambda/(4 \times n_3)$$

This case provides conditions under which the reflected light 8 and the reflected light 9 interfere with and intensify each other most, in which a quantity of light reflected from the thin film layer 4 increases to not less than 10 times that of the Fresnel reflection. This makes it possible to observe the interference fringes formed by the reflected light from the thin film layer 4 and the reflected light from the surface of the waveguide substrate 1, and to evaluate the thickness uniformity of the waveguide substrate 1 during polishing by utilizing the interference fringes. The polishing is performed appropriately according to the interference fringes thus observed by, for instance, varying the pressure distribution upon polishing so that the non-uniformity is reduced. Thus, the uniform thinning of the waveguide substrate 1 is enabled.

Using the foregoing method, the inventors of the present invention performed the polishing by keeping a state in which not more than one interference fringe was observed with in a plane, while measuring an absolute value of a thickness of the waveguide substrate 1 by the level difference meter, and finally they successfully thinned the waveguide substrate 1 to a thickness of 3.5 μm with a thickness variation of not more than 300 nm. It should be noted that in the interference fringe observation using a light source with a wavelength of 632.8 nm, it can be determined that the non-uniformity is approximately 300 nm per one interference fringe. It was confirmed by actual measurement that a ridge-type optical waveguide as shown in FIG. 1, formed by dry-etching the waveguide substrate 1 thus thinned, had excellent optical waveguide characteristics. Further, it is possible to produce a wavelength converter by forming a cyclic polarity inversion structure and an optical waveguide in a thinned substrate. Since this wavelength converter has an enhanced thickness uniformity of the optical waveguide, an excellent phase matching state is achieved, whereby a high wavelength conversion efficiency is achieved.

It should be noted that the interference occurs between the reflected light 8 and the reflected light 9 that causes the lights to cancel each other and consequently minimizes the reflected light from the thin film layer 4 when the thickness T satisfies:

$$T = (k \times \lambda)/(2 \times n_3)$$

where k represent a natural number. This is because there is a phase difference of π/2 between a phase of the reflected light at an interface of one side of the thin film layer 4 and a phase of the reflected light at an interface of the other side of the thin film layer 4. It should be noted that this applies in the case where $n_1 > n_3$ and $n_2 > n_3$ are satisfied.

When $n_1 > n_3 > n_2$ is satisfied, the reflected light is minimized when T satisfies $T = ((2k-1) \times \lambda)/(4 \times n_3)$.

In other words, when $n_1 > n_3$ and $n_2 > n_3$ are satisfied, T should be set so as to satisfy:

$$T \neq (k \times \lambda)/(2 \times n_3).$$

When $n_1 > n_3 > n_2$ is satisfied, T should be set so as to satisfy:

$$T \neq ((2k-1) \times \lambda)/(4 \times n_3).$$

When the thickness T of the thin film layer 4 is in a range of ±30 nm from the value satisfying $T = ((2k-1) \times \lambda)/(4 \times n_3)$ in particular, it is possible to limit the reduction of the intensity of the reflected light from the thin film layer 4 to not more than 5% from the maximum value. Therefore, by setting the thickness T of the thin film layer 4 in the foregoing range, the observation of the interference fringes is facilitated. Thus, it is preferable to perform the control of thickness in this range. It should be noted that if the reflected lights 8 and 9 have extremely low intensities, reflected light from the thin film layer 4 still has a low intensity even if the reflected lights 8 and 9 interfere with and intensify each other. However, it has been found by experiments that interference fringes can be observed in the case where at least one of a difference between the refractive indices $n_1$ and $n_3$ and a difference between the refractive indices $n_2$ and $n_3$ is not less than 0.05.

Embodiment 2 is described thus by referring to a case where the thin film layer 4 is a dielectric single-layer film containing $Ta_2O_5$ as a principal component, but the material of the thin film layer 4 is not limited to this. Besides, the same principle applies also in the case where the thin film layer 4 is a multilayer film. For instance, in the case where a multilayer film composed of a plurality of layers having different refractive indices is used as the thin film layer 4, low-reflection conditions and high-reflection conditions can be derived from refractive indices and thicknesses of the respective layers, as generally known.

For instance, as described above, on the waveguide substrate 1 made of MgO:LN crystal (having a refractive index of 2.17 with respect to light having a wavelength of 632.8 nm), two kinds of thin films containing $Ta_2O_5$ as a principal component, which have refractive indices of 2.05 and 2.10 respectively with respect to light having a wavelength of 632.8 nm, may be formed so as to compose a multi-layer film. The layers are configured so that layers having a refractive index of 2.05 are in contact with the waveguide substrate 1 and the base substrate 2. A thin film of one of the kinds that has a refractive index of 2.05 and a thin film of the other kind that has a refractive index of 2.10 are formed alternately so that the former has a thickness of 77 nm and the latter has a thickness of 75 nm. A multi-layer film composed of nine layers thus formed as the thin film layer 4 has a reflectance of 2.3%, while a multi-layer composed of nineteen layers as the thin film layer 4 has a reflectance of 7.1%. Thus, by controlling refractive indices and thicknesses of the respective layers of the multi-layer film, the reflectance can be controlled.

It should be noted that the low-reflection condition is defined as a condition under which reflected lights from interfaces of the respective layers have different phases and cancel one another, thereby decreasing an intensity of a reflected light. On the other hand, the high-reflection condition is defined as a condition under which reflected lights at interfaces of the respective layers are synthesized with one another, thereby increasing an intensity of a reflected light. By designing the thin film layer 4 according to the high-reflection condition, it is possible to maximize the reflected light from the thin film layer 4 as a whole.

It should be noted that Embodiment 2 is described with reference to a case where the light source for the interference fringe observation has a wavelength λ of 632.8 nm. However, examples of a light source generally used for the measurement purpose have wavelengths of 380 nm, 410 nm, 441.6 nm, 488 nm, 532 nm, etc. With respect to any one of these wavelengths, the optimal thickness of the thin film layer 4 can be determined by the same calculation, and the reflected light quantity from the thin film layer 4 can be increased.

EMBODIMENT 3

The following will describe an optical element according to Embodiment 3 of the present invention, while referring to the drawings. In the following description, an optical waveguide-type element produced by direct bonding is taken as an example of an optical element, in which a substrate formed with $LiNbO_3$ crystal (hereinafter abbreviated as LN crystal), which is a ferroelectric crystal, and a substrate formed with MgO-doped $LiNbO_3$ crystal (hereinafter abbreviated as MgO:LN crystal) are used as two substrates to be bonded by direct bonding. However, the present invention is not limited to this configuration.

An optical element according to Embodiment 3 is configured so that a non-bonding region is present in an optical element composed of two substrates (bonded paired substrates) having been subjected to optical polishing, the non-bonding region being a gap present at a part of a bonding surface.

The optical element according to Embodiment 3 has a characteristic in that a gap (non-bonding region) is provided at a part of a bonding surface when substrates of a same kind or different kinds are bonded so as to form the optical element. With this configuration, a refractive index difference is obtained in a substrate thickness direction. Therefore, for instance, by thinning one of the substrates bonded and thereafter forming a ridge structure so as to form an optical waveguide, an optical waveguide-type element can be produced irrespective of refractive indices of the substrates.

Figure 8:
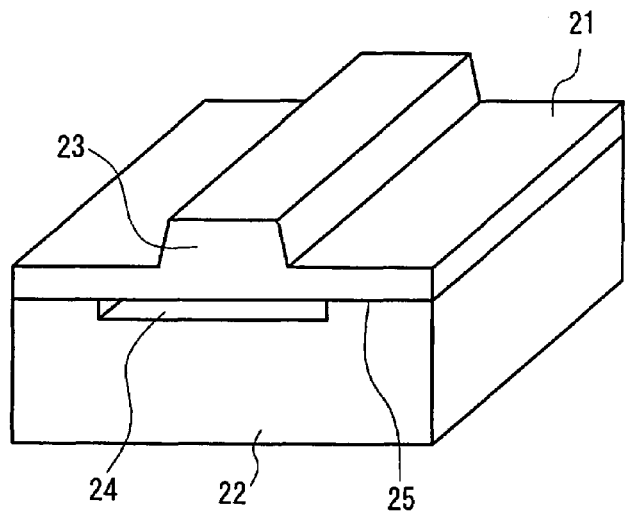
FIG. 8 is a perspective view illustrating a structure of an optical element according to Embodiment 3 of the present invention.

An optical element according to Embodiment 3 of the present invention is described below, with reference to the drawings. FIG. 8 is a perspective view illustrating a structure of the optical element according to Embodiment 3 of the present invention. The optical element of Embodiment 3 is configured so that a refractive index difference is obtained in the vicinity of a bonding surface between a base substrate 22 and a waveguide substrate 21 by providing a non-bonding region 24, in place of the thin film layer 4 in Embodiments 1 and 2. This configuration allows for the waveguiding of light, irrespective of a material used for forming the waveguide substrate 21, and enhances the waveguide characteristics. Therefore, it improves the selectivity of the material of the substrate.

For instance, a X-cut MgO:LN crystal substrate is used as the waveguide substrate 21. Further, a X-cut LN crystal substrate is used as the base substrate 22. Still further, the waveguide substrate 21 has a ridge structure so that a ridge-type optical waveguide 23 is formed. The optical waveguide 23 is not in contact with the base substrate 22, but a gap is provided therebetween to function as the non-bonding region 24. Principal surfaces of the waveguide substrate 21 and the base substrate 22 are subjected to optical polishing. Further, a surface of the base substrate 22 on the waveguide substrate 21 has a non-bonding region 24 that is recessed. The non-bonding region 24 is to form a gap when the base substrate 22 and the waveguide substrate 21 are bonded with each other. After the waveguide substrate 21 and the base substrate 22 are bonded, the gap formed by the non-bonding region 24 separates them from each other.

The following will describe a method for producing an optical element according to Embodiment 3. First, the non-bonding region 24 is formed on the base substrate 22. Various methods are available for forming the non-bonding region 24, and one example is dry-etching. On a principal surface of the base substrate 22 on one side, a Cr film is formed to have a thickness of 200 nm by RF sputtering or electron beam vapor deposition (EB vapor deposition), and a region where the non-bonding region 24 is to be formed is patterned by photolithography and wet etching. Thereafter, the base substrate 22 is subjected to dry etching using the Cr film as an etching mask, whereby an etching groove with a depth of 100 nm to 300 nm is formed as the non-bonding region 24. Thereafter, Cr used as a mask is removed by wet etching. It should be noted that the base substrate 22 may be formed by a method other than the foregoing method.

A principal surface of the waveguide substrate 21 and the principal surface of the base substrate 22 on which the non-bonding region 24 is formed, which are surfaces to be bonded directly, are subjected to a treatment for imparting hydrophilicity. More specifically, principal surfaces of the waveguide substrate 21 and the base substrate 22 to be subjected to direct bonding are subjected to acetone ultrasonic cleaning, and the substrates are immersed in a mixture solution of ammonia water (aqueous ammonia), hydrogen peroxide, and deionized water at a ratio of 1:1:6 (hereinafter referred to as ammonia-hydrogen peroxide solution) for not less than fifteen minutes, rinsed with deionized water, and thereafter, dried. It should be noted that normal ammonia water having a concentration of 20% to 40% may be used. Desirably, the ammonia water has a concentration of 30%.

Subsequently, the waveguide substrate 21 and the base substrate 22 are combined with each other so that directions of respective crystallographic axes of the waveguide substrate 21 and the base substrate 22 coincide with each other and that the surfaces thereof imparted with hydrophilicity are brought into contact. By applying a slight pressure thereto, the waveguide substrate 21 and the base substrate 22 are brought into close contact with each other, except for a portion where the non-bonding region 24 is formed.

Further, the waveguide substrate 21 and the base substrate 22 thus brought into close contact are subjected to a heat treatment, whereby a direct-bond substrate is obtained. The heat treatment is carried out at 350° C. to 800° C., with use of an oven, at a temperature rising rate of, for instance, 50° C./h to 500° C./h for preventing the delamination of the bonded substrates and damages due to rapid temperature rise.

To form the optical waveguide 23 in the direct-bond substrate thus obtained, the waveguide substrate 21 is subjected to surface polishing so as to be thinned, and finally has a thickness of 3 μm to 4 μm. Thereafter, a patterning corresponding to the optical waveguide 23 is carried out by photolithography, and a ridge of 1.5 μm to 2 μm is formed by dry-etching on the surface of the waveguide substrate 21 thus thinned, which is a MgO:LN crystal substrate. Thus, the ridge-type optical waveguide 23 is formed. It should be noted that both end faces of the optical waveguide 23 are mirror-finished after the ridge is formed.

It should be noted that the direct-bond substrate without a ridge waveguide being formed therein is applicable as an optical element such as a diffraction grating, a modulator, a deflector, etc.

Here, the non-bonding region 24 is described in more detail. Generally, the sufficient trapping of light in an optical waveguide and the waveguiding with low losses are regarded as the most important characteristics that a light-waveguide-type optical element is required to possess. Further, in order to make the transmission characteristic of an optical waveguide uniform through an entirety of the optical waveguide and to enhance a production yield, it is necessary to secure the uniformity in controlling a shape of the optical waveguide. In the control of the optical waveguide shape, in the case where one of the substrates directly bonded is thinned and an optical waveguide is formed therein, it is essential particularly that the thinned substrate has a high thickness uniformity.

A bonding surface 25 is one of principal surfaces of the waveguide substrate 21 at which the waveguide substrate 21 is in contact with the base substrate 22. In the bonding surface 25, the waveguide substrate 21 and the base substrate 22 partly are not in contact with each other. This is because the optical element according to Embodiment 3 has a gap as the non-bonding region 24 between the waveguide substrate 21 and the base substrate 22. Therefore, in the bonding surface 25, the optical waveguide 23 may be formed within a range where the gap is formed, whereby a refractive index difference can be caused between the optical waveguide 23 and the gap. Thus, this easily causes the optical waveguide 23 to have a sufficient light trapping effect in the substrate thickness direction. Here, if a portion bonded with the base substrate 22 is present in a region of the bonding surface 25 defined by projecting the optical waveguide 23 perpendicularly to the bonding surface 25, the optical waveguide 23 has an insufficient light trapping effect, and transmission losses of guided light increase. In other words, it is important that the non-bonding region 24 has to encompass the region defined by projecting the optical waveguide 23 to the bonding surface 25, or has to be broader than that. By so doing, a sufficient light trapping effect due to the refractive index difference can be achieved.

The process for forming the optical waveguide 23 is performed after thinning the waveguide substrate 21. By providing the non-bonding region 24, the alignment of the optical waveguide 23 with the non-bonding region 24 can be carried out easily by referring to the non-bonding region 24 as a reference, in the patterning process for forming the optical waveguide 23 by photolithography. Further, by forming the non-bonding region 24 by referring to the crystallographic axis of the base substrate 22, for instance, the optical waveguide 23 can be formed in conformity with the crystallographic axis of the base substrate 22. This enables the suppression of waveguide losses.

Further, the following describes the width of the non-bonding region 24 in the same direction as the width direction of the optical waveguide 23, and the interval of the non-bonding regions 24 in the width direction of the optical waveguide 23. In the case where a plurality of non-bonding regions 24 are formed, they should be formed at sufficient intervals so that a sufficient bond strength is secured for the process after the direct bonding. It has been confirmed by actual measurement that in the case where the non-bonding regions 24 are formed with an interval of not less than 1 mm between centers of adjacent non-bonding regions 24, a width of 1 μm to 500 μm of the non-bonding region 24 ensures a sufficient direct bond strength. Further, it also has been confirmed by actual measurement that in the case where the non-bonding regions 24 are formed with an interval of 30 μm to 1 mm between centers of adjacent non-bonding regions 24, a width of not more than 30 μm of the non-bonding region 24 ensures a sufficient direct bond strength. Further, when the optical waveguide 23 has a width of 5 μm, the non-bonding region 24 desirably has a width of 10 μm to 30 μm. Still further, when the non-bonding region 24 has a width of 30 μm, an interval between centers of the non-bonding regions 24 desirably is not less than 100 μM.

In the case where a plurality of optical waveguides 23 with a width of 3 μm each are formed, it is preferable that the width and the interval of the non-bonding regions 24 are set to be 5 μm to 10 μm and several 10 μm, respectively, considering the yield and the mass production of the optical element, and the characteristics of the optical waveguide 23.

Further, in the case where the non-bonding regions 24 are formed in a direction on the bonding surface, the load on the substrate upon machining (for instance, cutting or polishing) of the bonded substrate tends to be biased in the direction in which the non-bonding regions 24 are formed. This sometimes leads to damage to the optical element upon cutting or polishing, for instance. To prevent this problem, the non-bonding regions 24 preferably are provided in a lattice form as shown in FIG. 9.

Figure 9:
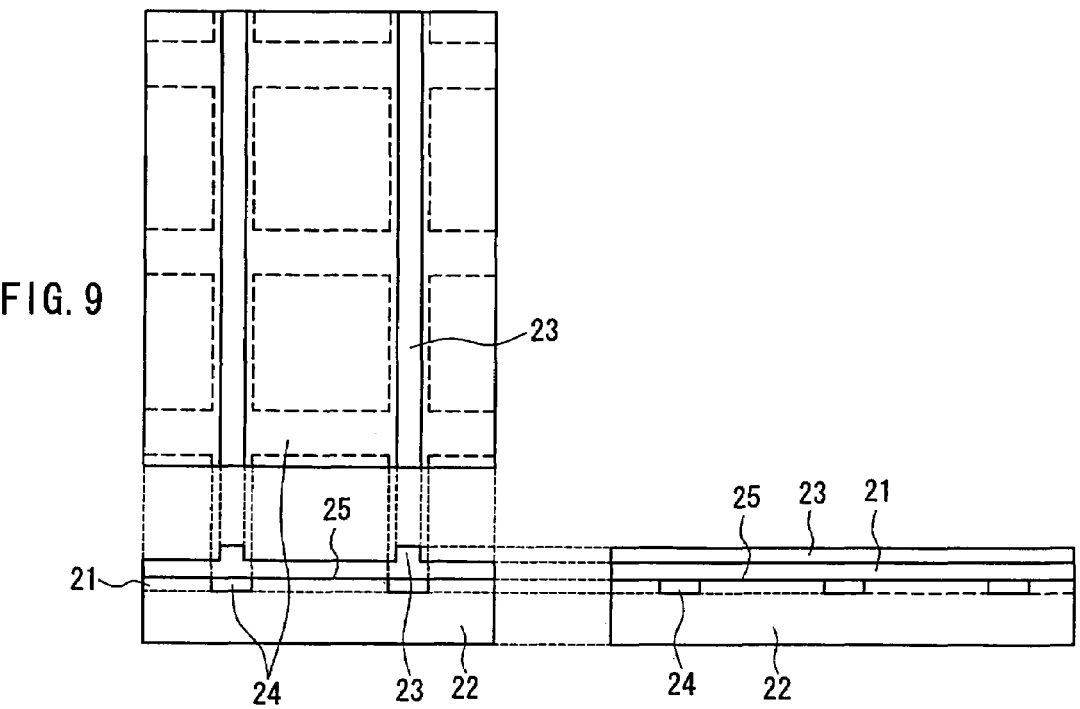
FIG. 9 is an orthographic drawing by the third angle projection method illustrating how non-bonding regions of the optical element of Embodiment 3 are arranged.

FIG. 9 is an orthographic drawing by the third angle projection method illustrating positions at which the non-bonding regions 24 are arranged. As shown in the plan view of FIG. 9, non-bonding regions 24 are arrayed not only in the direction along the optical waveguide 23 but also in a direction perpendicular to the optical waveguide 23. Further, all the intervals of the lattice are equal. In other words, the non-bonding regions 24 are formed in a lattice form of equal intervals. This configuration distributes and reduces the load upon cutting or polishing, thereby allowing for improved bond strength. In this configuration, machining resistance was measured with the density of the bonding regions varied, and it was found that a high machining resistance was obtained. By patterning the non-bonding regions 24 in a lattice form of equal intervals in a direct-bonding surface, the machining resistance of the direct-bond substrate can be increased.

Next, the following describes a depth (gap depth) of the non-bonding region 24 in the substrate thickness direction. As described above, since the optical waveguide 23 has a ridge structure, the light trapping effect is sufficient in the width direction of the optical waveguide 23 and on the opposite side of the base substrate 22. Further, it is necessary to make sure that the guided light does not leak, either, through the non-bonding region 24 side of the optical waveguide 23. In other words, the non-bonding region 24 has to have a gap depth such that no leaked portion of light propagating through the optical waveguide 23 is present in the base substrate 22.

Therefore, optical elements were produced according to Embodiment 3 with a gap width of 0.005 μm to 0.5 μm, and characteristics of the elements were determined. As a result, in the case where the gap depth was not less than 0.01 μm, no deterioration was observed in the light trapping effect in the thickness direction of the optical waveguide 23. Therefore, in a state in which the non-bonding region 24 is filled with air, a gap depth of the non-bonding region 24 of not less than 0.01 μm suffices to allow the guided light to propagate through the optical waveguide 23 sufficiently. However, as described above, by forming the non-bonding region 24 by dry-etching, it is possible to control the gap depth with a high precision of several %.

It should be noted that the use of substrates with high parallelism (thickness uniformity) as the waveguide substrate 21 and the base substrate 22 enables the thickness control with high precision in the polishing and thinning of the waveguide substrate 21 also. For instance, the thickness uniformity of the waveguide substrate 21 thinned to a thickness of 3 μm was controlled so as to be within a range of ±50 nm within a 3-inch wafer plane.

Further, when the waveguide substrate 21 and the base substrate 22 are bonded by direct bonding, the smoothness degrees of the surfaces to be bonded are significant. For instance, when the surface to be bonded has a surface roughness of 5 nm or more, the bonding is difficult. Therefore, in the case where the film forming, the etching, or another process is carried out before the waveguide substrate 21 and the base substrate 22 are bonded directly, smoothnesses of the surfaces to be bonded may be deteriorated, which is not preferable. However, it was confirmed by actual measurement that virtually no deterioration occurred in the smoothness of principal surfaces of the base substrate 22 having been subjected to a process such as Cr sputtering, photolithography, wet-etching, dry-etching, etc. as described above, and therefore, the direct bonding of the foregoing base substrate 22 with the waveguide substrate 21 was achieved readily.

Further, a concern also arises about the possible damage to the air gap portion (the non-bonding region 24) in the polishing and thinning process with respect to the waveguide substrate 21, as well as about the possible deterioration of bond strength, that is, the delamination upon polishing due to the presence of the non-bonding regions 24. However, it was also confirmed that the waveguide substrate 21 and the base substrate 22 that were bonded directly did not exhibit any delamination or deterioration even in the process after the direct bonding (polishing and thinning of the waveguide substrate 21, photolithography, dry-etching, end-face polishing, etc.), and the excellent bonding state was maintained.

Furthermore, it was also confirmed that the optical waveguide 23 in the optical element according to Embodiment 3 had excellent waveguide characteristics, and a sufficient light trapping effect and waveguiding with low transmission losses were achieved.

It should be noted that in a configuration example of an optical element in which the waveguide substrate 21 and the base substrate 22 are bonded directly and which has the non-bonding region 24, the non-bonding region 24 is formed by forming a recess on the base substrate 22, but the non-bonding region 24 may be formed by forming a recess on the waveguide substrate 21. This configuration can be formed readily, and achieves the same effects.

Further, materials used for forming the waveguide substrate 21 and the base substrate 22 are not limited, and the provision of the non-bonding region allows an optical element to be formed by bonding substrates of different kinds or a same kind by direct bonding without limiting refractive indices of the substrates. It should be noted that a bonding method other than the direct bonding may be used for bonding substrates.

Figure 10:
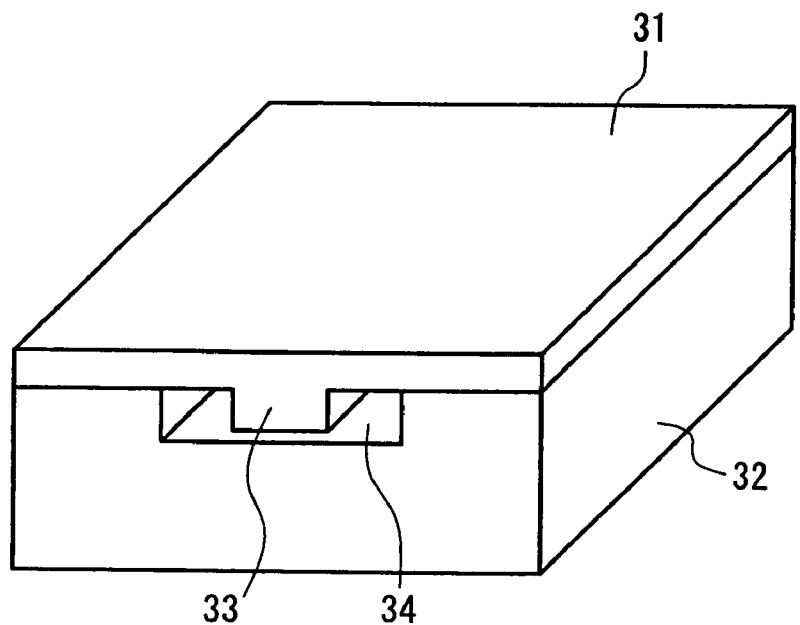
FIG. 10 is a perspective view illustrating another configuration of an optical element according to Embodiment 3 of the present invention.

FIG. 10 is a perspective view illustrating another configuration of an optical element according to Embodiment 3. As shown in FIG. 10, the optical element may be configured so that an optical waveguide 33 is arranged within a non-bonding region 34. For this configuration, a waveguide substrate 31 on which a ridge-type optical waveguide 33 is formed beforehand, and a base substrate 32 having a non-bonding region 34 that is obtained by forming a recess, are prepared. For instance, an X-cut MgO:LN crystal substrate and an X-cut LN crystal substrate are used as the waveguide substrate 31 and the base substrate, respectively. Principal surfaces of the waveguide substrate 31 and the base substrate 32 are subjected to optical polishing. The optical waveguide 33 is present within the non-bonding region 34 that is provided by forming a recess in the base substrate 32, and a gap also is present therein, separating the optical waveguide 33 from the base substrate 32. With this configuration, an excellent direct bonding state and excellent waveguide characteristics of the optical waveguide 33 were obtained.

It should be noted that though the optical element according to Embodiment 3 is described as an optical element of an optical waveguide type, but it is not limited to an optical element of an optical waveguide type. It is possible to, for instance, form cyclic non-bonding regions in a part of the bonding surface, so as to make the element a diffractive optical element.

EMBODIMENT 4

Figure 11:
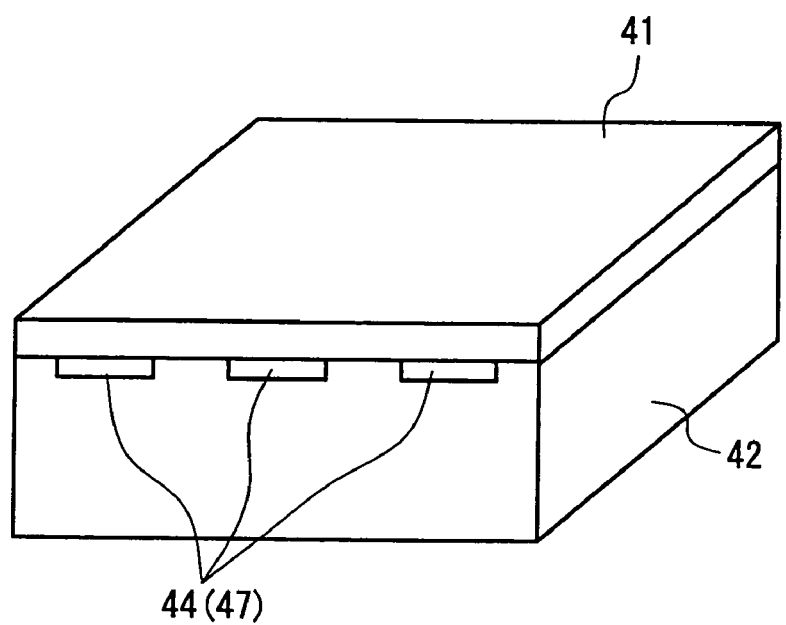
FIG. 11 is a perspective view illustrating a configuration of an optical element according to Embodiment 4.

The following will describe an optical element according to Embodiment 4 while referring to the drawings. FIG. 11 is a perspective view illustrating the optical element according to Embodiment 4. The optical element according to Embodiment 4 is obtained by filling the non-bonding region of the optical element of Embodiment 3 with a material different from materials used for forming the substrates to be bonded, for instance, ultraviolet (UV) curable resin. By so doing, the bonding is reinforced by the adhesiveness of the UV curable resin, in addition to the bond strength between the substrates bonded directly. This further enhances the machining resistance during the process subsequent to the bonding (thinning of the direct-bond substrate by polishing, etc.).

In FIG. 11, a X-cut MgO:LN crystal substrate as a waveguide substrate 41 and a X-cut LN crystal substrate as a base substrate 42 are bonded with each other. A non-bonding region 44 is formed by forming a recess on the base substrate 42, which is filled with an UV curable resin 47. Further, principal surfaces of the waveguide substrate 41 and the base substrate 42 are subjected to optical polishing. In FIG. 11, a plurality of non-bonding regions 44 are formed, but the number of the same is not limited to this. It should be noted that in the optical element, the waveguide substrate 41 may be configured to have a refractive index higher than that of the UV curable resin 47 filled in the non-bonding region 44 and that of the base substrate 42 so that the waveguide substrate 41 functions as a waveguide, or refractive indices may be varied so that selective waveguiding is achieved. Furthermore, the waveguide substrate 41 may be processed so as to have a ridge structure, to function as a ridge waveguide.

The method for producing the optical element according to Embodiment 4 is identical to that of the optical element according to Embodiment 3 partway. More specifically, for instance, a Cr film is formed on the base substrate 42 by RF sputtering or EB vapor deposition, patterned by photolithography or wet-etching, and subjected to dry-etching, so that the non-bonding regions 44 are formed. Thereafter, the waveguide substrate 41 and the base substrate 42 are subjected to a treatment for imparting hydrophilicity, brought into close contact with each other, and subjected to a heat treatment, whereby they are bonded directly. This is followed by a process different from that in Embodiment 3.

An UV curable resin 47 is filled in a gap formed as the non-bonding region 44 in the direct-bond substrate obtained by the foregoing producing process. Here, the UV curable resin 47 flows into the non-bonding region 44 formed in the direct-bond substrate by capillary action. In the case where an UV curable resin with a low viscosity (approximately 60 cp or less) is used as the UV curable resin 47 in particular, the speed of the capillary action increases significantly, whereby the filling is competed within a short period of time more easily.

Thereafter, ultraviolet rays are projected to the direct-bond substrate from outside its surface. This cures the UV curable resin 47 filled, and causes a strong bonding force to be achieved between the waveguide substrate 41 and the base substrate 42. Thereafter, a ridge structure may be formed to make the optical element an optical waveguide type. Alternatively, the optical element may be processed, or may be used as it is, according to its purpose of use.

Further, the optical element according to Embodiment 4 has an effect of distributing and reducing a load on the substrates since the UV curable resin 47 functions as a buffer upon machining. Therefore, there is less possibility of damage to the substrates or delamination at the bonded portions subjected to direct bonding even upon the polishing and thinning of the waveguide substrate 41, for instance.

Still further, in the case where the optical element according to Embodiment 4 is made to be, for instance, an optical element of an optical waveguide type, the material filled in the non-bonding region 44 prevents any foreign matter to the gap from entering the gap and contacting the waveguide substrate 41. Therefore, the waveguide characteristics do not deteriorate.

Figure 12:
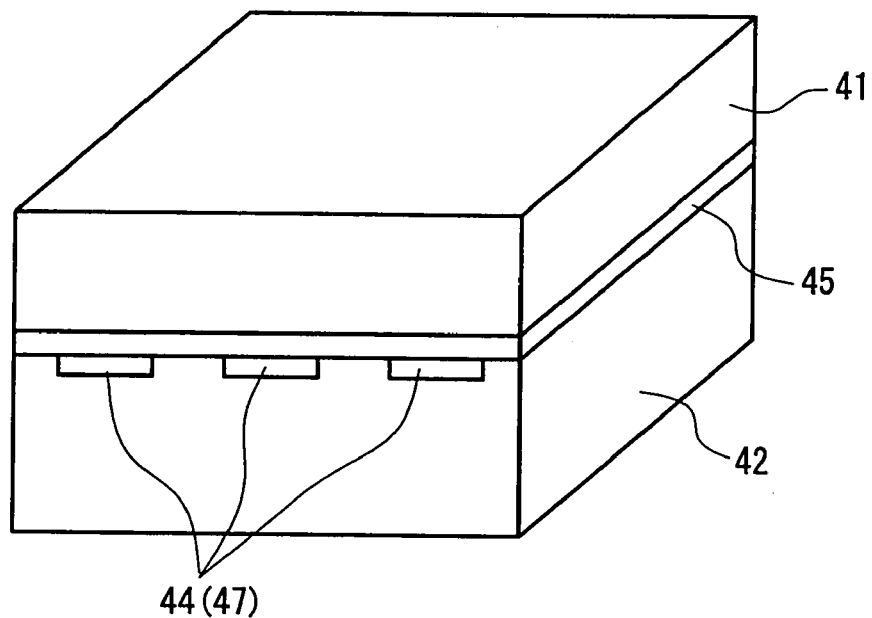
FIG. 12 is a perspective view illustrating another configuration of an optical element according to Embodiment 4.

Another configuration example of the optical element according to Embodiment 4 is shown in FIG. 12. As shown in FIG. 12, the waveguide substrate 41 and the base substrate 42 may be bonded with each other with a thin film layer 45 interposed therebetween. Since the highly precise and uniform film thickness control can be achieved with respect to a thin film, if a dielectric is used for forming a thin film, it is possible to achieve various refractive indices and absorption coefficients by selecting the material.

A method of producing the optical element shown in FIG. 12 includes the bonding of the base substrate 42 having the non-bonding region 44 formed thereon with the waveguide substrate 41, like in the method for producing the optical element shown in FIG. 11. Here, the thin film layer 45 is formed beforehand on the waveguide substrate 41 in the same manner as that for forming the thin film layer 4 of the optical element in Embodiments 1 and 2. It should be noted that the thin film layer 45 preferably has a refractive index smaller than those of the waveguide substrate 41 and the base substrate 42, for instance, a single-layer film containing $Ta_2O_5$ as a principal component.

The base substrate 42 having the non-bonding region 44 and the waveguide substrate 41 having the thin film layer 45 are combined so that the thin film layer 45 and the side of the base substrate 42 on which the non-bonding region 44 is formed are bonded directly. Thereafter, an UV curable resin 47 is filled in the non-bonding region 44. Subsequently, UV rays are projected to the direct-bond substrate from outside the surface, whereby the UV curable resin 47 filled is cured.

Figure 13:
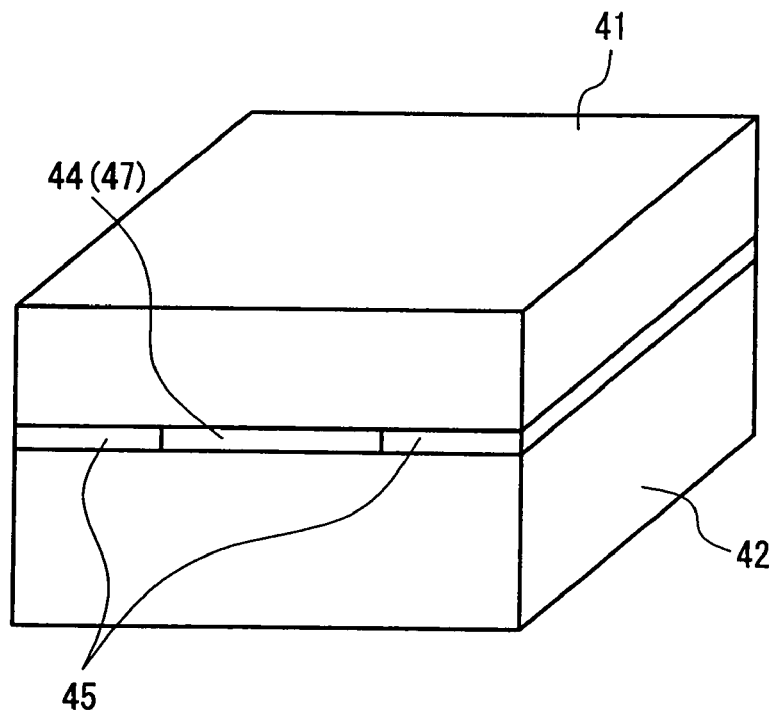
FIG. 13 is a perspective view illustrating still another configuration of an optical element according to Embodiment 4.

Still another configuration example of the optical element according to Embodiment 4 is shown in FIG. 13. As shown in FIG. 13, the optical element may be configured so that the thin film layer 45 and the non-bonding region 44 are selectively formed in the same layer on the base substrate 42, and the waveguide substrate 41 is formed thereon. The foregoing configuration is obtained by forming the thin film layer 45 on the waveguide substrate 41 or the base substrate 42 by sputtering or the like, patterning the same by photolithography or dry-etching, and removing the thin film layer 45 partially. A portion where the thin film layer 45 is removed becomes as the non-bonding region 44. After bonding the waveguide substrate 41 and the base substrate 42 by direct bonding, the UV curable resin 47 is filled in the non-bonding region 44.

As described above, even in the case where the waveguide substrate 41 and the base substrate 42 are bonded with the thin film layer 45 interposed therebetween, it is possible to enhance the bond strength by removing the thin film layer 45 partly to provide the non-bonding region 44, filling the UV curable resin 47 therein, and curing the same.

It should be noted that though the material to be filled in the non-bonding region 44 is an UV curable resin herein, the material is not limited to this.

EMBODIMENT 5

The following will describe an optical element according to Embodiment 5 of the present invention while referring to the drawings. FIGS. 14A to 14D are front views illustrating steps for producing an optical element according to Embodiment 5 successively. The optical element of Embodiment 5 is identical to the optical element of Embodiment 3 except that a dielectric layer is formed in the non-bonding region.

Figure 14A:
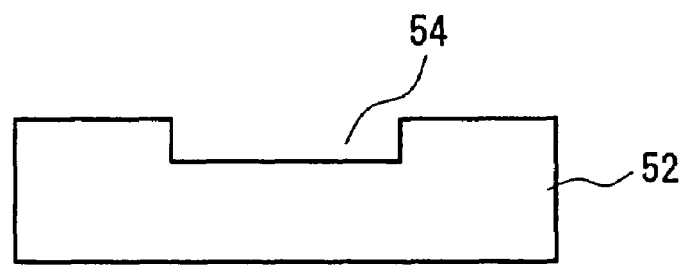
FIGS. 14A to 14D are front views of an optical element according to Embodiment 5 of the present invention, which are shown according to an order of a production process.
Figure 14B:
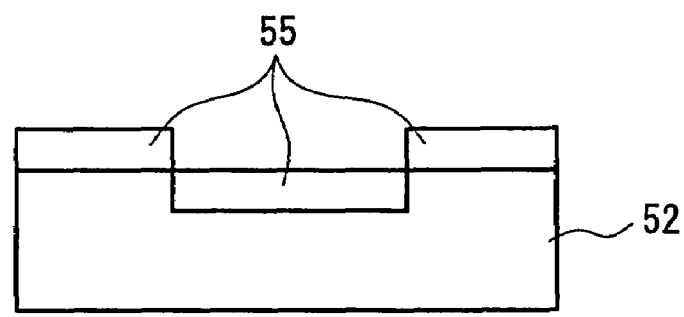
Figure 14C:
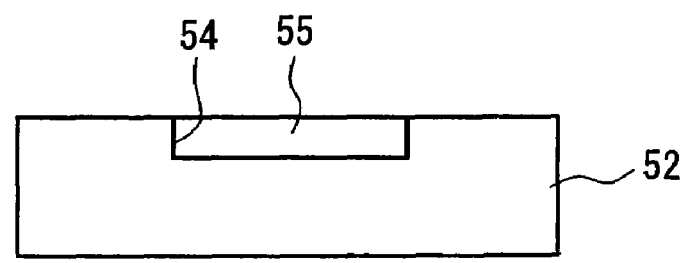
Figure 14D:
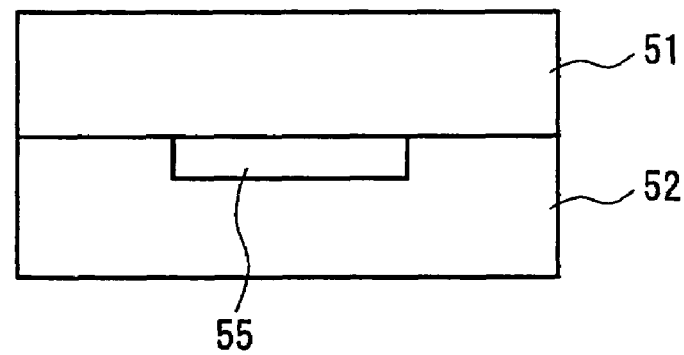

FIG. 14D is a front view illustrating a state of the optical element finished. In FIG. 14D, an X-cut MgO:LN crystal substrate as a waveguide substrate 51 and an X-cut LN crystal substrate as a base substrate 52 are bonded with each other. In a recessed region on the base substrate 52, a dielectric layer 55 is formed. The dielectric layer 55 is, for instance, a single-layer film containing $Ta_2O_5$ as a principal component.

The following will describe a method for producing an optical element according to Embodiment 5. First of all, as shown in FIG. 14A, a non-bonding region 54 is formed on the base substrate 52. Then, the thin film layer 55 is deposited on a surface of the base substrate 52 by sputtering as shown in FIG. 14B. Since the thin film layer 55 is formed on the base substrate 52, only a small bond strength is achieved if the direct bonding is carried out in this state, and the machining resistance of the thin film is insufficient. Therefore, as shown in FIG. 14C, a state is created in which the thin film layer 55 is deposited only in the non-bonding region 54. More specifically, the thin film layer 55 is removed by polishing except for the portion in the non-bonding region 54 using a chemical mechanical polishing (CMP) device, so as to smoothen a surface of the base-substrate 52 including the thin film layer 55. It should be noted that the CMP device is a polishing device with extremely high precision, known as a device capable of achieving the absolute polishing degree control at a submicronic or more minute level and the surface smoothness at the precision of not more than several 10 nm.

The depth of the non-bonding region 54 is set to be 100 nm to 300 nm, and the thickness of the thin film layer 55 deposited is set to be 150 nm to 350 nm. The CMP process is controlled so that the principal surface of the base substrate 52 is trimmed by approximately 50 nm. This causes the surface of the base substrate 52 to be exposed completely, and the surface of the thin film layer 55 and the surface of the base substrate 52 to be smoothened. It should be noted that by depositing the thin film layer 55 so that its thickness exceeds the depth of the non-bonding region 54, it is possible to smooth the surface of the thin film layer 55 and the surface of the base substrate 52 by the CMP process. Since the use of the CMP device makes it possible to carry out the foregoing polishing and to apply the mirror-finishing also to the polished surface simultaneously, an effect of omitting a separate step of applying the mirror-finishing for the direct bonding can be achieved.

As shown in FIG. 14D, the base substrate 52 and the waveguide substrate 51 are combined so that crystallographic axis directions of the substrates coincide with each other and that the principal surface of the base substrate 52 having the non-bonding region 55 thereon and the principal surface of the waveguide substrate 51 are brought into contact with each other, and a slight pressure is applied thereto. Thus a close contact state is created, and the substrates are subjected to a heat treatment so as to be bonded directly. The base substrate 52 polished by the CMP device, when bonded with the waveguide substrate 51 by direct bonding, ensures creation of a close contact state and a direct-bond state at substantially the same level as that of the direct bonding of normal substrates.

In a bond substrate thus obtained also, since a high substrate bonding precision by direct bonding is achieved, it is possible to achieve simultaneously both of the significant improvement of machining resistance because of the direct-bond state of the base substrate 52 and the waveguide substrate 51, and the multifunctionality and high performance (low losses, multifunctionality) of the optical element because of the possession of the dielectric thin film, as compared with the configuration of Embodiment 1 in which only the thin film layer and the base substrate are bonded directly.

Figure 15A:
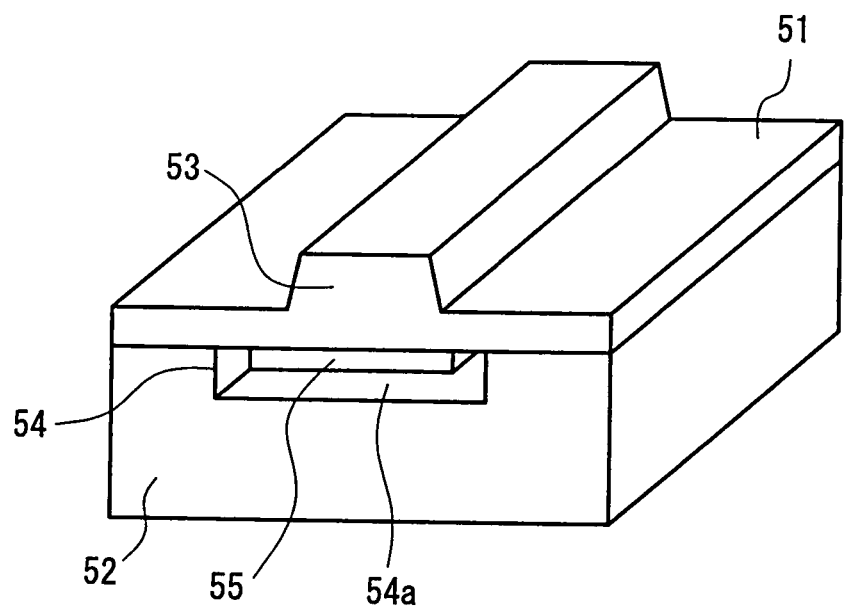
FIGS. 15A and 15B are a perspective view and a front view, respectively, illustrating a structure of an optical element according Embodiment 5 of the present invention.
Figure 15B:
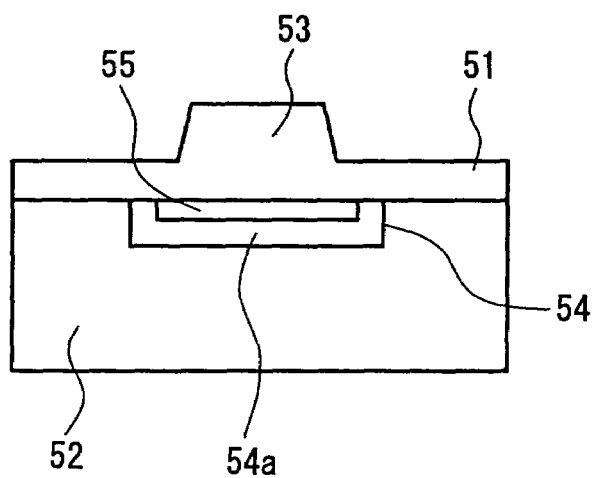

It should be noted that the thin film layer 55 may be formed partly in the non-bonding region 54. For instance, as shown in FIGS. 15A and 15B in an optical element in which an optical waveguide 53 is formed, the thin film layer 55 is formed in the waveguide substrate 51, so as to be at least formed in a surface region defined by perpendicularly projecting the optical waveguide 53 thereto. With this configuration, guided light is trapped sufficiently in the waveguide. This configuration reduces a volume of the thin film layer 55, whereby the production cost can be reduced.

The following will describe a method for forming the optical waveguide shown in FIGS. 15A and 15B. First, the thin film layer 55 is formed on a surface of the waveguide substrate 51 opposite to the surface on which the optical waveguide 53 is formed. Then, the thin film layer 55 is patterned by photolithography, dry-etching, etc., so that the thin film layer 55 is formed at least exactly below the optical waveguide 53. Finally, the waveguide substrate 51 and the base substrate 52 are bonded directly. With this process, it is possible to produce an optical element without polishing. It should be noted that a resin or the like may be filled in a space 54a in the non-bonding region 54. This reinforces the bonding surface.

EMBODIMENT 6

The following will describe an optical element according to Embodiment 6 of the present invention while referring to the drawings. The optical element according to Embodiment 6 is configured so that a plurality of substrates having been subjected to optical polishing are stacked, and the substrates are bonded with one another by direct bonding. Further, non-bonding regions are arranged cyclically in each substrate.

Figure 16:
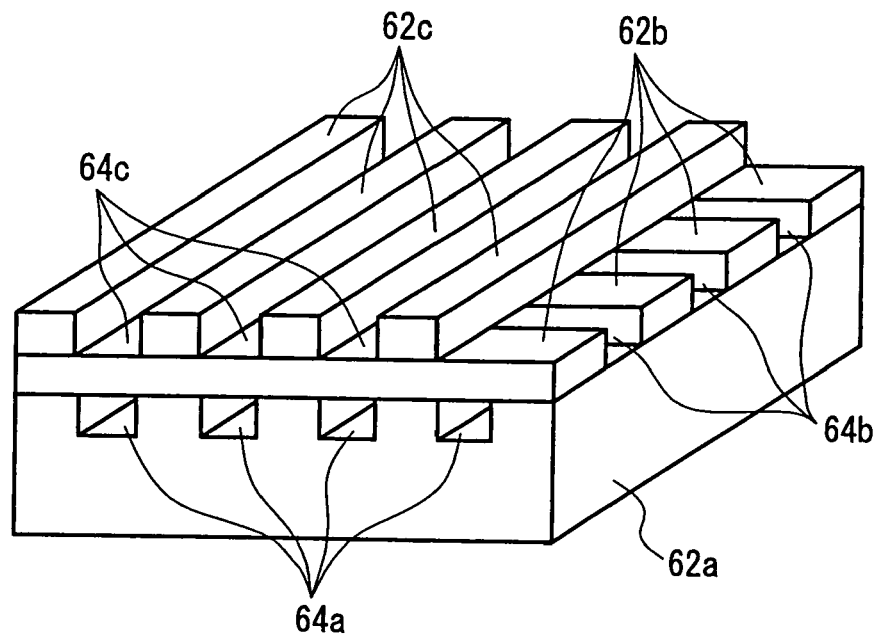
FIG. 16 is a perspective view illustrating a configuration of an optical element according to Embodiment 6 of the present invention.

FIG. 16 is a perspective view of the optical element according to Embodiment 6 of the present invention. The optical element of Embodiment 6 is formed by repetitively carrying out the following process, so as to form a stacked structure. The process includes bonding a substrate having non-bonding regions with another substrate by direct bonding, thinning the substrate thus bonded, and forming non-bonding regions. A base substrate 62a includes non-bonding regions 64a that are grooves formed in parallel with one another at regular intervals. On the base substrate 62a, bar-form substrates 62b are formed in parallel with one another at regular intervals, so as to cross the non-bonding regions 64a perpendicularly. A groove-like non-bonding region 64b is formed between each pair of adjacent bar-like substrates 62b. Further, on the substrates 62b, a plurality of bar-like substrates 62c are formed in parallel with one another at regular intervals, so as to cross the non-bonding regions 64b perpendicularly. A groove-like non-bonding region 64c is formed between each pair of adjacent bar like substrates 62b.

Figure 17:
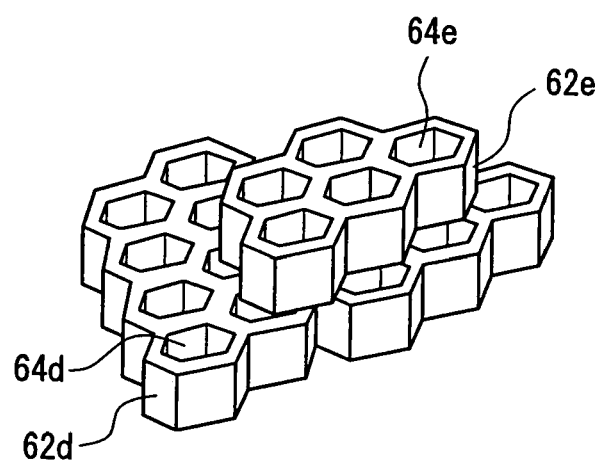
FIG. 17 is a perspective view illustrating another configuration of an optical element according to Embodiment 6 of the present invention.

The following will describe a method for producing the optical element of Embodiment 6. Specifically, first of all, non-bonding regions 64a are formed on a LN crystal substrate as the base substrate 62a by dry-etching using a Cr film formed by sputtering, for instance, as an etching mask. After the patterning of Cr, the base substrate 62a is subjected to dry-etching using Cr as an etching mask, so that stripe-like etching grooves (non-bonding regions) with a depth of 3 μm are formed at regular intervals. It should be noted that the patterning by photolithography enables the patterning of a desired pattern with high precision. For instance, the non-bonding regions can be formed in a pattern of cyclically arranged polygons. More specifically, an optical element as shown in FIG. 17 can be formed. In other words, it is possible to form an optical element in which substrates 62d and 62e having cyclically arranged hexagonal etching grooves (non-bonding regions 64d and 64e) are bonded so that a cycle of hexagons of one substrate is shifted by a half cycle from a cycle of hexagons of the other substrate.

On the other hand, non-bonding regions 64b that are 3 μm-wide etching grooves are formed on one principal surface of a LN crystal substrate as the substrate 62b in the same manner as that described above. It should be noted that a direction of etching grooves of the substrate 62b is determined considering that the base substrate 62a and the substrate 62b are bonded so that directions of etching grooves of the base substrate 62a and the substrate 62b cross each other perpendicularly. Thereafter, Cr used as a mask is removed by wet-etching, and surfaces to be bonded, that is, the principal surface of the base substrate 62a on which the non-bonding regions 64a are formed, and the principal surface of the substrate 62b on which the non-bonding regions 64b are formed, are subjected to a treatment for imparting hydrophilicity. Thereafter, the base substrate 62a and the substrate 62b are combined so that crystallographic axis directions of the substrates coincide with each other and so that the principal surface of the base substrate 62a having the non-bonding regions 64a and the principal surface of the substrate 62b having the non-bonding regions 64b are brought into contact with each other, whereby a state of close contact between the base substrate 62a and the substrate 62b is formed. Further, the substrates in close contact are subjected to a heat treatment, so that the base substrate 62a and the substrate 62b are bonded directly, whereby a direct-bond substrate is obtained.

In the direct-bond substrate thus obtained, the substrate 62b is polished and thinned so as to have a thickness of 2.5 μm. By so doing, the substrate 62b is modified from a single substrate into a plurality of bar-like substrates. Further, by the same technique as that described above, a substrate 62c on which etching grooves as non-bonding regions 64c are formed is bonded directly with the plurality of bar-like substrates 62b so that the non-bonding regions 64b and the non-bonding regions 64c cross each other perpendicularly, and is polished and thinned. This process is carried out repetitively, whereby substrates are stacked. In other words, non-bonding regions are formed on a substrate, the substrate is bonded directly with another substrate so that a non-bonding-region-formed surface is in contact with the another substrate, and the substrate thus bonded directly is polished and thinned, so that a plurality of bar-like substrates are formed.

Through the foregoing process, a crystal substrate having a periodically stacked structure is formed. This is called a photonic crystal, which is a medium having a structure in which the refractive index cyclically varies, and which is capable of controlling lightwave. A photonic crystal has a characteristic of possessing a band structure with respect to lightwave, and draws attention as being capable of providing a specific waveguiding control. Generally, the production of photonic crystal is carried out by electron beam exposure, so that electron holes with a diameter of several 100 nm to several 100 μm each are arranged cyclically in a crystal. Therefore, the production of a photonic crystal requires fine micromachining, and has been regarded very difficult.

According to the optical element producing method according to Embodiment 6, the formation of non-bonding regions by dry-etching makes it possible to form cyclically arranged non-bonding regions. Further, it is possible to produce an optical element in which the size of the non-bonding regions, the interval thereof, and the thickness thereof in the substrate thickness are in the submicronic order to several 10 μm. Therefore, it is possible to produce a photonic crystal by the optical element producing method according to Embodiment 6. Furthermore, generally, a photonic crystal formed with a polycrystalline material that requires the strict control of the composition and the crystalline structure, but according to Embodiment 6, the structure can be produced using a homogeneous monocrystalline material.

It should be noted that materials composing optical elements and structures of the same in the embodiments described above are merely examples, and the present invention is not limited to these specific examples. The method for bonding substrates is not limited to the direct bonding, either.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical element, comprising:
    a base substrate;
    a waveguide substrate; and
    a thin film layer provided between the base substrate and the waveguide substrate, having a single-layer structure or a multilayer structure including a film containing $Ta_2O_5$ or $Nb_2O_5$ as a principal component, wherein
    the waveguide substrate is made of a crystal that is transparent with respect to light having a wavelength λ and that has a refractive index $n_1$ with respect to the light having the wavelength λ,
    the base substrate is made of a material having a refractive index $n_2$ with respect to the light having the wavelength λ,
    the thin film layer is made of a material having a refractive index $n_3$ with respect to the light having the wavelength λ, and has a thickness T satisfying,
    when $n_1 > n_3$ and $n_2 > n_3$, $T \neq (k \times \lambda)/(2 \times n_3)$, and
    when $n_1 > n_3 > n_2$, $T \neq ((2k-1) \times \lambda)/(4 \times n_3)$
    where $n_3 \neq n_1 \neq n_2$, and k represents a natural number.

2. The optical element according to claim 1, wherein at least one of bonding between the base substrate and the thin film layer and bonding between the waveguide substrate and the thin film layer is direct bonding.

3. The optical element according to claim 1, wherein the waveguide substrate is made of $LiNb_xTa_{(1-x)}O_3 (0 \leq x \leq 1)$.

4. The optical element according to claim 1, wherein an optical waveguide is formed in the waveguide substrate.

5. The optical element according to claim 1, wherein the thin film layer has a thickness of not less than 50 nm.

6. The optical element according to claim 2, wherein the thin film layer includes a film containing $Ta_2O_5$ or $Nb_2O_5$ as a principal component on a surface to be subjected to the direct bonding.

7. The optical element according to claim 1, wherein the thin film layer is a film formed on either the base substrate or the waveguide substrate in an atmosphere at a temperature of not lower than 100° C.

8. The optical element according to claim 1, wherein
    the thin film layer is a multilayer film including a metal layer, the metal layer being not arranged on a surface of the thin film layer on a side of the waveguide substrate, and
    the waveguide substrate is bonded with the thin film layer.

9. The optical element according to claim 8, wherein the metal layer is formed on a surface of thin film layer on a side of the base substrate.

10. The optical element according to claim 8, wherein a surface of the metal layer on a side of the waveguide substrate, and a surface of the waveguide substrate on a side of the metal layer, are separated with a distance of not less than 50 nm therebetween.

11. The optical element according to claim 8, wherein a distance between the metal layer and a light-incident end surface exceeds 1 μm.

12. The optical element according to claim 1, wherein the wavelength λ is one selected from 380 nm, 410 nm, 441.6 nm, 488 nm, 532 nm, and 632.8 nm.

13. The optical element according to claim 1, wherein
    the waveguide substrate is made of a transparent crystal, and
    the thin film layer has a multilayer film structure made of a plurality of dielectric materials having different refractive indices, the thin film layer being configured so that when the light having the predetermined wavelength is incident perpendicularly on the waveguide substrate, lights reflected at the respective layers have phase differences such that the reflected lights do not cancel one another.

14. The optical element according to claim 13, wherein the transparent crystal has a light transmissivity with respect to light with a wavelength in a range covering one selected from 380 nm, 410 nm, 441.6 nm, 488 nm, 532 nm, and 632.8 nm.

* * * * *